United States Patent
Kuge et al.

(10) Patent No.: US 10,231,176 B2
(45) Date of Patent: Mar. 12, 2019

(54) BASE STATION DEVICE, TERMINAL DEVICE, LOCATION MANAGEMENT DEVICE, AND CONTROL METHOD

(71) Applicant: SHARP KABUSHIKI KAISHA, Sakai, Osaka (JP)

(72) Inventors: Yoko Kuge, Sakai (JP); Masafumi Aramoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/517,145

(22) PCT Filed: Aug. 28, 2015

(86) PCT No.: PCT/JP2015/074483
§ 371 (c)(1),
(2) Date: Apr. 5, 2017

(87) PCT Pub. No.: WO2016/056321
PCT Pub. Date: Apr. 14, 2016

(65) Prior Publication Data
US 2017/0311245 A1      Oct. 26, 2017

(30) Foreign Application Priority Data
Oct. 6, 2014 (JP) .................. 2014-205334

(51) Int. Cl.
*H04W 48/18* (2009.01)
*H04W 48/16* (2009.01)
(Continued)

(52) U.S. Cl.
CPC ........... *H04W 48/18* (2013.01); *H04W 48/16* (2013.01); *H04W 60/04* (2013.01); *H04W 92/045* (2013.01)

(58) Field of Classification Search
CPC ....... H04W 36/14; H04W 72/10; H04W 8/04; H04W 8/065; H04W 8/08
(Continued)

(56) References Cited

U.S. PATENT DOCUMENTS

| 9,706,530 B2 * | 7/2017 | Zembutsu | H04W 76/10 |
| 2015/0312822 A1 * | 10/2015 | Bangolae | H04W 36/08 370/311 |

(Continued)

FOREIGN PATENT DOCUMENTS

JP      2015056848      * 9/2013

OTHER PUBLICATIONS

3GPP TR 23.707 V0.2.0 (Jul. 2014), 3rd Generation Partnership Project; Technical Specification Group Services and System Aspects; Architecture Enhancements for Dedicated Core Networks; Stage 2 (Release 13), pp. 8-10, 14-16, 18-20.
(Continued)

*Primary Examiner* — Timothy Pham
(74) *Attorney, Agent, or Firm* — Birch, Stewart, Kolasch & Birch, LLP

(57) ABSTRACT

In a communication system constituting a first core network and a second core network, a location management device deployed in a first core network initiates a switching procedure between the core networks. In the switching procedure, the second core network is selected by MME selection of a base station device, allowing a terminal device to connect to the second core network. This configuration provides a communication control method and the like for enabling a terminal device to switch between core networks in a communication system in which multiple core networks are overlaid.

21 Claims, 9 Drawing Sheets

(51) Int. Cl.
*H04W 60/04* (2009.01)
*H04W 92/04* (2009.01)

(58) Field of Classification Search
USPC .......................................................... 455/434
See application file for complete search history.

(56) References Cited

U.S. PATENT DOCUMENTS

| | | | | |
|---|---|---|---|---|
| 2015/0327133 | A1* | 11/2015 | Yiu | H04W 48/20 455/436 |
| 2016/0050601 | A1* | 2/2016 | Jeong | H04W 36/14 455/436 |
| 2016/0128051 | A1* | 5/2016 | Zembutsu | H04W 76/10 370/329 |
| 2016/0219476 | A1* | 7/2016 | Onishi | H04L 61/1511 |
| 2016/0227457 | A1* | 8/2016 | Tanaka | H04W 8/04 |
| 2016/0249278 | A1* | 8/2016 | Qi | H04W 48/14 |
| 2017/0127324 | A1* | 5/2017 | Liang | H04W 36/08 |
| 2017/0188280 | A1* | 6/2017 | Watfa | H04W 36/12 |
| 2017/0272993 | A1* | 9/2017 | Jeong | H04W 36/14 |

OTHER PUBLICATIONS

3GPP TS 23.401 V12.5.0 (Jun. 2014), 3rd Generation Partnership Project; Technical Specification Group Services and System Aspects; General Packet Radio Service (GPRS) enhancements for Evolved Universal Terrestrial Radio Access Network (E-UTRAN) access (Release 12), pp. 1-305.

3GPP TS 23.401 V13.0.0 (Sep. 2014), 3rd Generation Partnership Project; Technical Specification Group Services and System Aspects; General Packet Radio Service (GPRS) enhancements for Evolved Universal Terrestrial Radio Access Network (E-UTRAN) access (Release 13), pp. 30-31, 140-142.

* cited by examiner

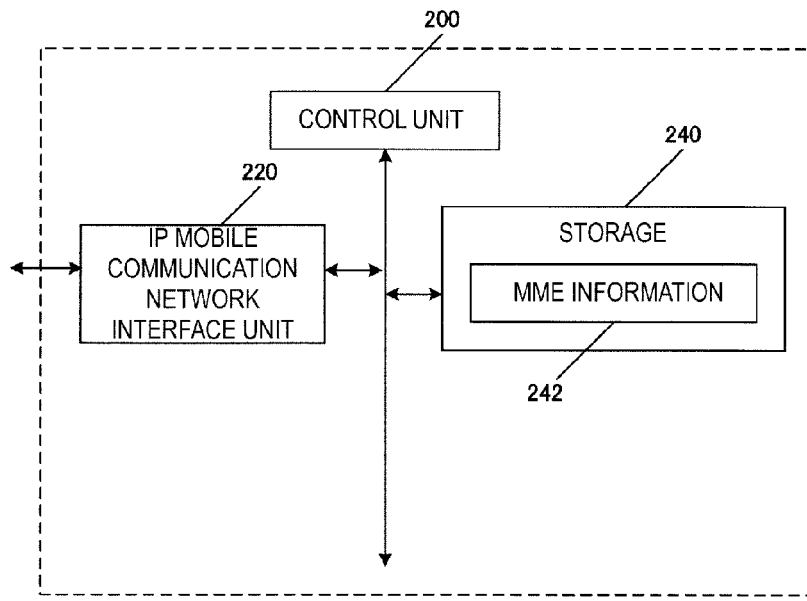

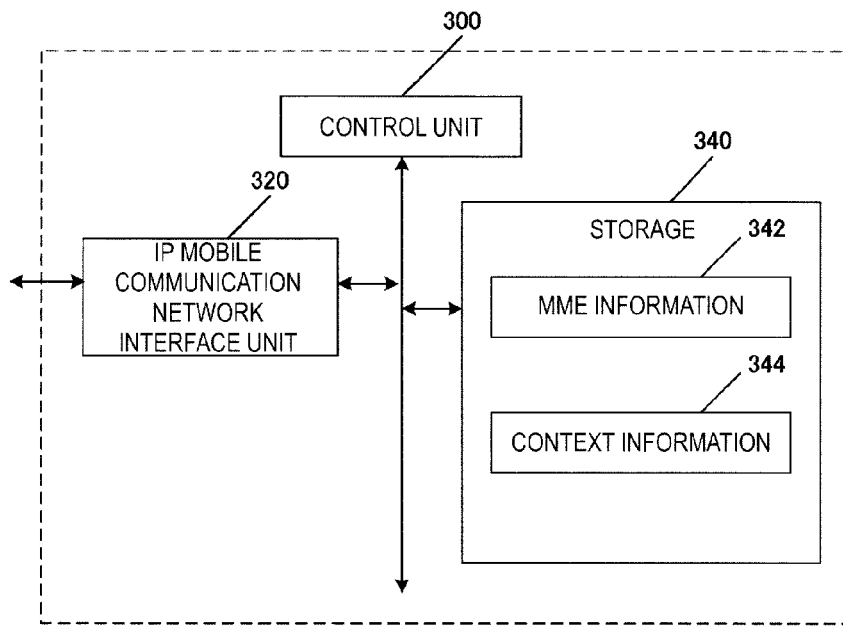
FIG. 4A  MME DEVICE CONFIGURATION
FIG. 4B  MME INFORMATION
| MME IDENTIFICATION INFORMATION | AREA | CORE NETWORK TYPE |
|---|---|---|
| GUMMEI(A) | A | TYPE 1 |
| GUMMEI(B) | A | TYPE 2 |
| GUMMEI(C) | B | TYPE 1 |
| GUMMEI(D) | B | TYPE 2 |
FIG. 4C  CONTEXT INFORMATION
| UE IDENTIFICATION INFORMATION | CONTEXT |
|---|---|
| UE ID A | CONTEXT A |
| UE ID B | CONTEXT B |

BASE STATION DEVICE, TERMINAL DEVICE, LOCATION MANAGEMENT DEVICE, AND CONTROL METHOD

TECHNICAL FIELD

The present invention relates to a base station device, a terminal device, a location management device, and a control method.

BACKGROUND ART

The 3rd Generation Partnership Project (3GPP), which undertakes activities for standardizing recent mobile communication systems, is in the process of creating specifications for the Evolved Packet System (EPS), which realizes an all-IP-based architecture (see NPL 1). EPS is a mobile communication system through which mobile operators and the like provide mobile telephone services, and is constituted of a core network called the Evolved Packet Core (EPC), an access network based on the Long Term Evolution (LTE) radio communication standard, and the like.

In developing the specifications for EPS, the 3GPP is further considering dedicated core networks (DECOR) for the purpose of overlaying core networks. According to DECOR, a communication system has multiple networks overlaid therein, and terminal devices that connect to different networks in a manner that depends on, for example, their respective terminal types. This configuration makes it possible to distribute terminal traffic in a manner that depends on the terminal type, and manage traffic in a manner that depends on the terminal type.

For example, the configuration can accommodate machine to machine (M2M) terminals by connecting to an M2M-dedicated core network, which is more prevalent recently, whereas normal mobile phone terminals such as smartphones connect to a main core network.

CITATION LIST

Non Patent Literature

NPL 1: 3GPP TS23.401 Technical Specification Group Services and System Aspects, General Packet Radio Service (GPRS) enhancements for Evolved Universal Terrestrial Radio Access Network (E-UTRAN) access (Release 12)

SUMMARY OF INVENTION

Technical Problem

DECOR asserts that the main core network is separated from overlaid core networks in a manner that depends on the characteristics of terminal devices. These core networks are configured to include different mobile management devices.

As such, it is necessary to appropriately select the core network to which the terminal device will connect to based on the type or characteristics of the terminal. To do so, it is necessary to appropriately select a location management device based on the type or characteristics of the terminal.

However, at present, there is no clear method for appropriately selecting a core network based on the type or characteristics of the terminal, and connecting the terminal to the selected core network.

In light of such circumstances, an object of the present invention is to provide a favorable method for a terminal, in a mobile communication system constituted of multiple overlaid core networks, to connect to an appropriate core network and perform mobile communication.

Solution to Problem

A base station device according to the present invention is a base station device connected to a first core network including a first location management device and a second core network including a second location management device. The base station device is configured to: receive, from the first location management device, a context release message or a route reconfiguration request message including at least first identification information, the first identification information being identification information that gives an instruction or a request for connection to the second core network; receive an attach request message or a tracking area update request message from a terminal device; select the second location management device based on the first identification information; and transmit the attach request message or the tracking area update request message to the selected second location management device.

In the base station device according to the present invention, the first identification information is a core network type associated with the second core network.

In the base station device according to the present invention, the first identification information is group identification information on a location management device included in the second core network.

The base station device according to the present invention is configured to: start a timer upon reception of the context release request message; select the second location management device based on the first identification information when the timer is in operation; and transmit the attach request message or the tracking area update request message to the first location management device when the timer is not in operation.

The base station device according to the present invention is configured to: transmit an RRC connection release request message to the terminal device on the basis of reception of the context release request message; and include, in the RRC connection release request message, at least identification information and second identification information that gives an instruction or a request for connection to the second core network.

A terminal device according to the present invention is configured to: receive a detach request message including at least first identification information and information indicating that attach is required, from a first location management device included in a first core network, the first identification information being identification information that gives an instruction or a request for connection to a second core network; transmit, to a base station device, an attach request message with at least second identification information included in the attach request message to start an attach procedure triggered by the reception of the detach message, the second identification information being identification information that gives an instruction or a request for connection to the second core network; and establish, upon completion of the attach procedure, a packet data network (PDN) connection with a gateway device included in the second core network.

A terminal device according to the present invention is configured to: receive a paging message including at least first identification information from a first location management device included in a first core network, the first identification information being identification information that gives an instruction or a request for connection to a second core network; transmit a service request message to the first location management device triggered by the reception of the paging message; receive a service reject message from the first location management device, the service reject message being a response to the service request message and including at least identification information indicating a detached state; transmit, to a base station device, an attach request message with at least second identification information included in the attach request message to start an attach procedure triggered by the reception of the service reject message, the second identification information being identification information that gives an instruction or a request for connection to the second core network; and establish, upon completion of the attach procedure, a packet data network (PDN) connection with a gateway device included in the second core network.

In the terminal device according to the present invention, the first identification information and/or the second identification information is a core network type associated with the second core network.

In the terminal device according to the present invention, the first identification information and/or the second identification information is comprised of group identification information on a location management device included in the second core network.

A location management device according to the present invention is a location management device included in a first core network. The location management device is configured to: transmit a context release request message or a route reconfiguration request message including at least first identification information to a base station device, the first identification information being identification information that gives an instruction or a request for connection to a second core network; and receive, from the base station device, a response message to the context release request message or the route reconfiguration request message.

The location management device according to the present invention is configured to transmit a detach request message or a paging message including at least the first identification information to a terminal device; and transmit the context release request message or the route reconfiguration request message after the transmission of the detach request message or the paging message.

In the location management device according to the present invention, the first identification information is a core network type associated with the second core network.

In the location management device according to the present invention, the first identification information is comprised of group identification information on a location management device included in the second core network.

A method for controlling a base station device according to the present invention involves the controlling of a base station device connected to a first core network including a first location management device and a second core network including a second location management device. The method includes the steps of: receiving, from the first location management device, a context release request message or a route reconfiguration request message including at least first identification information, the first identification information being identification information that gives an instruction or a request for connection to the second core network; receiving an attach request message or a tracking area update request message from a terminal device; and selecting the second location management device based on the first identification information and transmitting the attach request message or the tracking area update request message to the selected location management device.

A method for controlling a base station device according to the present invention is a method for controlling a base station device connected to a first core network including a first location management device and a second core network including a second location management device. The method includes the steps of: receiving, from the first location management device, a context release request message or a route reconfiguration request message including at least first identification information, the first identification information being identification information that gives an instruction or a request for connection to the second core network; starting a timer upon reception of the context release request message; receiving an attach request message or a tracking area update request message from a terminal device; selecting the second location management device based on the first identification information when the timer is in operation and transmitting the attach request message or the tracking area update request message to the selected location management device; and transmitting the attach request message or the tracking area update request message to the first location management device when the timer is not in operation.

With regards to the method for controlling a base station device according to the present invention, the first identification information is a core network type associated with the second core network.

With regards to the method for controlling a base station device according to the present invention, the first identification information is a group identification information on a location management device included in the second core network.

The method for controlling a base station device according to the present invention includes the steps of: transmitting an RRC connection release request message to the terminal device triggered by the reception of the context release request message; and including, in the RRC connection release request message, at least identification information and second identification information that gives an instruction or a request for connection to the second core network.

A method for controlling a terminal device according to the present invention includes the steps of: receiving a detach request message including at least first identification information and information indicating that attach is required, from a first location management device included in a first core network, the first identification information being identification information that gives an instruction or a request for connection to a second core network; transmitting, to a base station device, an attach request message with at least second identification information included in the attach request message to start an attach procedure on the basis of reception of the detach message, the second identification information being identification information that gives an instruction or a request for connection to the second core network; and establishing, upon completion of the attach procedure, a packet data network (PDN) connection with a gateway device included in the second core network.

A method for controlling a terminal device according to the present invention includes the steps of: receiving a paging message including at least first identification information from a first location management device included in a first core network, the first identification information being identification information that gives an instruction or a request for connection to a second core network; transmitting a service request message to the first location management device triggered by reception of the paging message; receiving a service reject message from the first location management device, the service reject message being a response to the service request message and including at least identification information indicating a detached state; transmitting, to a base station device, an attach request message with at least second identification information included in the attach request message to start an attach procedure triggered by the reception of the service reject message, the second identification information being identification information that gives an instruction or a request for connection to the second core network; and establishing, upon completion of the attach procedure, a packet data network (PDN) connection with a gateway device included in the second core network.

With regards to the method for controlling the terminal device according to the present invention, the first identification information and/or the second identification information is a core network type associated with the second core network.

With regards to the method for controlling the terminal device according to the present invention, the first identification information and/or the second identification information is a group identification information on a location management device included in the second core network.

A method for controlling a location management device according to the present invention is a method for controlling a location management device included in a first core network, which includes the steps of: transmitting a context release request message or a route reconfiguration request message including at least first identification information to a base station device, the first identification information being identification information that gives an instruction or a request for connection to a second core network; and receiving, from the base station device, a response message to the context release request message or the route reconfiguration request message.

The method for controlling a location management device according to the present invention includes the steps of: transmitting a detach request message or a paging message including at least the first identification information to a terminal device; and transmitting the context release request message or the route reconfiguration request message after the transmission of the detach request message or the paging message.

With regards to the method for controlling a location management device according to the present invention, the first identification information is a core network type associated with the second core network.

With regards to the method for controlling a location management device according to the present invention, the first identification information is a group identification information on a location management device included in the second core network.

Advantageous Effects of Invention

According to the present invention, procedures whereby a terminal device switches core networks and connects to one of the core networks in a communication network constituted of overlaid core networks can be implemented.

BRIEF DESCRIPTION OF DRAWINGS

FIGS. 2A and 2B are diagrams illustrating the configuration of an IP mobile communication network and the like.

FIGS. 3A to 3C are diagrams illustrating the functional configuration of an eNB.

FIGS. 4A to 4C are diagrams illustrating the functional configuration of an MME.

DESCRIPTION OF EMBODIMENT

Hereinafter, a preferred embodiment for carrying out the pre sent invention will be described with reference to the drawings. Note that the present embodiment describes an example of a mobile communication system to which the present invention is applied.

1. First Embodiment

Hereinafter, a radio communication technology according to an embodiment of the present invention will be described in detail with reference to the drawings.

1.1 System Overview

Figure 1:
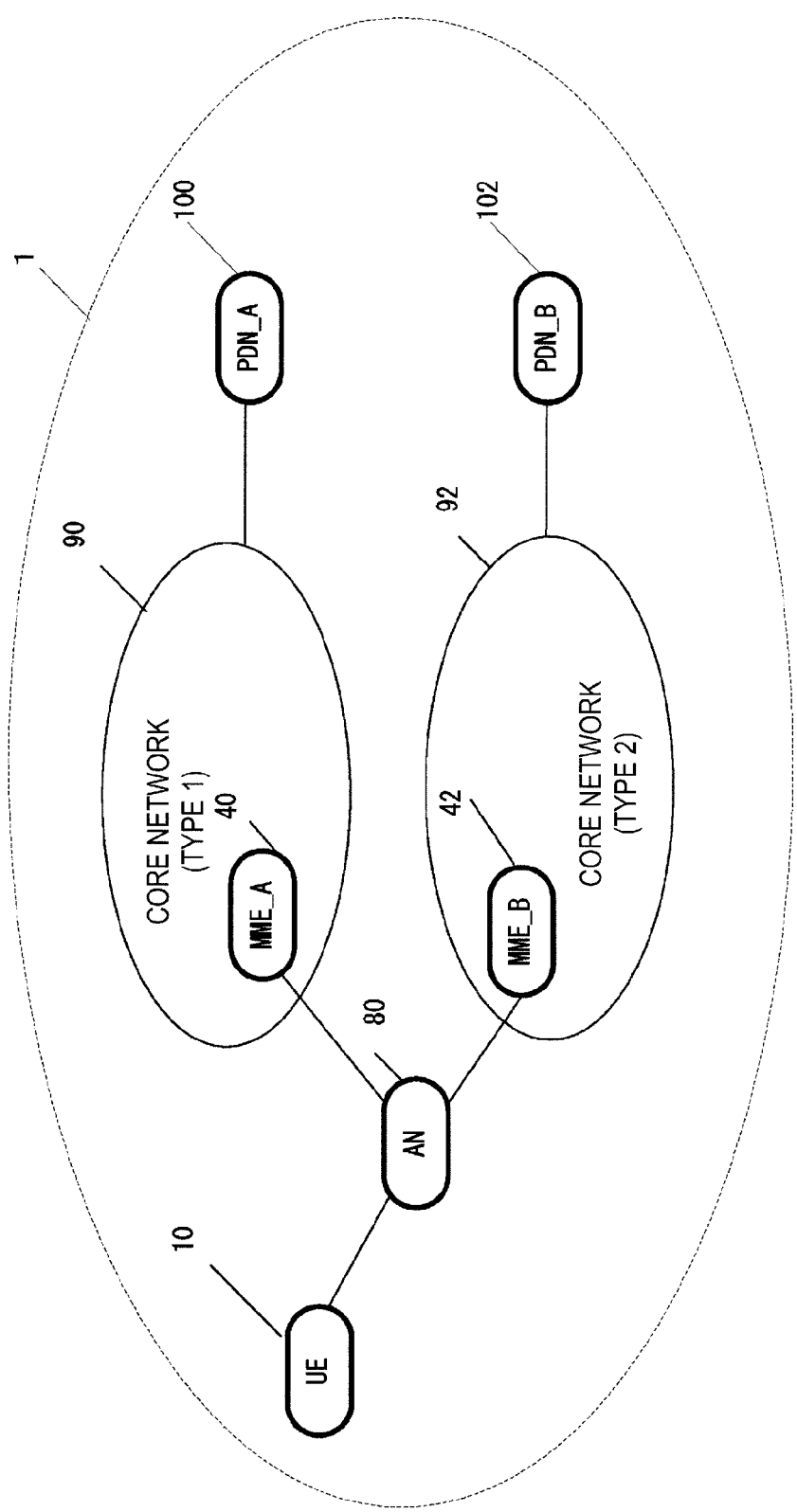
FIG. 1 is a diagram illustrating an overview of a mobile communication system.

FIG. 1 is a diagram illustrating an overview of a mobile communication system according to the present embodiment. As illustrated in FIG. 1, a mobile communication system 1 is constituted of a mobile terminal device UE 10, an access network 80, a core network (type 1) 90, a core network (type 2) 92, a packet data network (PDN)_A 100, and a PDN_B 102.

Here, "core network" refers to an IP mobile communication network run by a mobile operator. Note that the core network (type 1) 90 and the core network (type 2) 92 may be networks that are overlaid in the mobile communication system 1.

The core network (type 1) 90 and the core network (type 2) 92 may be core networks run and managed by a single mobile operator. Alternatively, these core networks may be core networks run and managed by respective mobile operators. For example, the core network (type 1) 90 may be a core network for the mobile operator that runs and manages the mobile communication system 1, whereas the core network (type 2) 92 may be a core network for a virtual mobile operator such as a mobile virtual network operator (MVNO). Thus, the core network (type 2) 92 may be configured as a virtual mobile operator network. Here, "type", such as type 1 and type 2, may refer to information identifying a core network. The information identifying a core network is not limited to "type" and may be any information capable of identifying a core network. For example identification numbers assigned to core networks by network operators may be used to identify multiple overlaid core networks. Alternatively, when multiple mobile network operators including an MVNO have respective core networks, the core networks may be identified by information identifying the mobile operators.

Furthermore, the UE 10 may have a core network type assigned thereto in advance. For example, the UE 10 may be managed as a terminal that can be connected to a type 2 core network. The UE 10 may be managed as a terminal that can be connected to a type 1 core network in a place where the type 2 core network is not provided.

Such management information may be stored in a control device, such as a home subscriber server (HSS) or a mobility management entity (MME), in the core networks as subscriber information. The UE 10 may also store the management information.

A UE to which a core network type has been assigned and a UE to which a core network type has not been assigned may coexist. The UE to which a core network type has not been assigned may connect to a default core network. The core network which serves as the default core network may be managed by the mobile operator or the like in advance, and the default network may be determined in accordance with such management information. For example, a PDN connection may be established with the core network (type 1) 90, which is a main core network, serving as the default network. On the other hand, the UE to which a core network type has been assigned may connect to a dedicated core network corresponding to the specified type to establish a PDN connection.

Furthermore, such types may be set to each UE before terminal shipment. Additionally, multiple types may be set before shipment, and a user or the UE itself may then change the type in accordance with the purpose of communication.

The core network (type 1) 90 includes a mobility management entity (MME)_A 40.

Likewise, the core network (type 2) 92 includes an MME_B 42.

Each core network is connected to a corresponding packet data network (PDN). The PDN is a packet data service network providing communication services to the UE 10, and may be constituted for each of the services. The PDN has a communication terminal connected thereto, and the UE 10 can transmit/receive user data to/from the communication terminal deployed in the PDN.

For example, as illustrated in FIG. 1, the core network (type 1) 90 may be connected to the PDN_A 100, and the core network (type 2) 92 may be connected to the PDN_B 102. As described above, the core networks may be connected to different PDNs.

Furthermore, the PDN_A 100 and the PDN_B 102 may be packet data networks, outside the core networks, corresponding to the purposes of the UE. For example, when the core network (type 1) 90 is a main core network, the PDN_A 100 may be an IP multimedia subsystem (IMS) or the like. Furthermore, when the core network (type 2) 92 is a core network dedicated to M2M terminals, the PDN_B 102 may be an M2M service network.

Next, some examples of core network constitutions will be described. Each core network is constituted of a home subscriber server (HSS), an authentication, authorizing, accounting (AAA), a policy and charging rules function (PCRF), a packet data network gateway (PGW), an enhanced packet data gateway (ePDG), a serving gateway (SGW), and an MME.

Such devices may be deployed in each core network. Alternatively, overlaying the core networks is intended to distribute control message traffic or user data traffic, which allows the management devices such as the HSS, the AAA and the PCRF to be shared by multiple core networks instead of being deployed in each core network.

Furthermore, when the overlaying of the core networks is only intended to distribute control message traffic, devices that forward user data such as the PGW and the SGW may also be shared by the multiple core networks instead of being deployed in each core network.

Figure 2A:
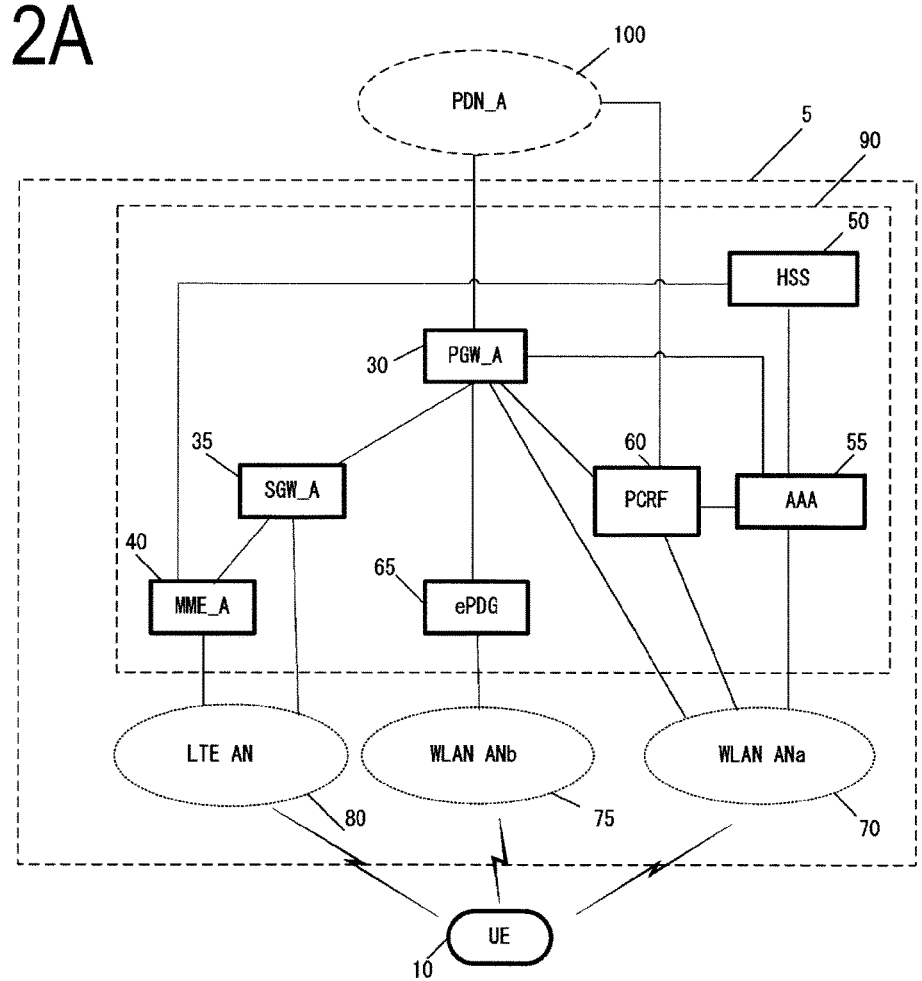
Figure 2B:
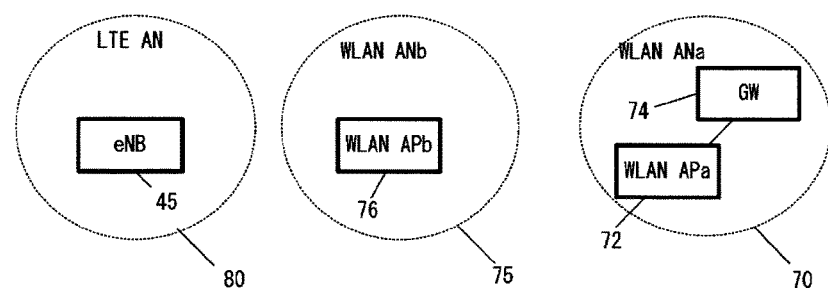

Note that the present embodiment will be mainly described with reference to an example in which the core network (type 1) 90 is constituted of the HSS 50, the AAA 55, the PCRF 60, the PGW_A 30, the ePDG 65, the SGW_A 35, and the MME_A 40 as illustrated in FIGS. 2A and 2B.

In addition, the present embodiment will be mainly described with reference to an example in which the core network (type 2) 92 is constituted of the HSS 50, the AAA 55, the PCRF 60, the PGW_B 32, the ePDG 65, the SGW_B 37, and the MME_B 42.

In other words, the HSS 50, the AAA 55, the PCRF 60, and the ePDG 65 are shared by the core networks. Moreover, the present embodiment will be mainly described with reference to an example in which the MME, the PGW, and the SGW are deployed in each core network.

Additionally, each core network can connect to multiple access networks (an LTE AN 80, a WLAN ANb 75, and a WLAN ANa 70).

Such a radio access network may be configured with connections to multiple different access networks, or may be configured with a connection to any one of the access networks. Furthermore, the UE 10 can wirelessly connect to the radio access network.

Furthermore, the WLAN access network b (WLAN ANb 75) that connects to the core network via the ePDG 65 and the WLAN access network a (WLAN ANa 75) that connects to the PGW (PGW_A 30, PGW_B 32), the PCRF 60, and the AAA 55 can be configured as access networks that can connect in a WLAN access system.

Note that each device has the same configuration as conventional devices in a mobile communication system using EPS, and thus detailed descriptions will be omitted. Each device will be described briefly hereinafter.

The PGW_A 30 is connected to the PDN_A 100, the SGW_A 35, the ePDG 65, the WLAN ANa 70, the PCRF 60, and the AAA 55 and is a relay device that forwards user data by functioning as a gateway device between the PDN_A 100 and the core network 90.

The SGW_A 35 is connected to the PGW_A 30, the MME_A 40, and the LTE AN 80, and is a relay device that forwards user data by functioning as a gateway device between the core network (type 1) 90 and the LTE AN 80.

The MME_A 40 is connected to the SGW_A 35, the LTE AN 80, and the HSS 50 and is an access control device that is responsible for location information management and access control for the UE 15 via the LTE AN 80.

The core network (type 1) 90 may be configured to include multiple location management devices. For example, an MME_C may be configured as a location management device different from the MME_A 40. Like the MME_A 40, the MME_C may be connected to the SGW_A 35, the LTE AN 80, and the HSS 50.

Additionally, the MME_C and the MME_A 40 may be connected to each other. This configuration allows the MME_C and the MME_A 40 to transmit/receive the context of the UE 10 to/from each other.

The HSS 50 is connected to the MME_A 40 and the AAA 55 and is a managing node that manages subscriber information. The subscriber information in the HSS 50 is referred to during MME_A 40 access control, for example.

The HSS 50 may also be connected to the MME_B 42. As illustrated in FIG. 1, the MME_B 42 is included in a network overlaid on the core network (type 1) 90, namely the core network (type 2) 92.

In other words, the HSS 50 may be connected to an MME, such as the MME_B 42, included in a core network different from the core network in which the HSS 50 is included. Furthermore, the subscriber information in the HSS 50 is also referred to during MME_B 42 access control.

The AAA 55 is connected to the PGW_A 30, the HSS 50, the PCRF 60, and the WLAN ANa 70, and is responsible for access control for the UE 10 connected via the WLAN ANa 70.

The PCRF 60 is connected to the PGW_A 30, the WLAN ANa 75, the AAA 55, and the PDN 100, and manages QoS for data delivery. For example, the PCRF 60 manages QoS of a communication path between the UE 10 and the PDN_A 100.

The ePDG 65 is connected to the PGW_A 30 and the WLAN ANb 75, and delivers user data by functioning as a gateway device between the core network (type 1) 90 and the WLAN ANb 75.

As illustrated in FIG. 2B, each radio access network includes devices to which the UE 10 is actually connected (such as a base station device and an access point device), and the like. The devices used in these connections can be thought of as devices adapted to the radio access networks.

In the present embodiment, the LTE AN 80 is configured to include an eNB 45. The eNB 45 is a radio base station to which the UE 10 connects in an LTE access system, and the LTE AN 80 may be configured to include one or multiple radio base stations.

The WLAN ANa 70 is configured to include a WLAN APa 72 and a gateway (GW) 74. The WLAN APa 72 is a radio base station to which the UE 10 connects in a WLAN access system trusted by the operator running the core network (type 1) 90, and the WLAN ANa 70 may be configured to include one or multiple radio base stations. The GW 74 is a gateway device between the core network (type 1) 90 and the WLAN ANa 70. The WLAN APa 72 and the GW 74 may be configured as a single device.

Even when the operator that runs the core network (type 1) 90 is different from the operator that runs the WLAN ANa 70, contracts or agreements between the operators may allow such a configuration.

Additionally, the WLAN ANb 75 is configured to include a WLAN APb 76. The WLAN APb 76 is a radio base station to which the UE 10 connects in a WLAN access system when a trust relationship cannot be established with the operator that runs the core network (type 1) 90, and the WLAN ANb 75 may be configured to include one or multiple radio base stations.

As described above, the WLAN ANb 75 is connected to the core network (type 1) 90 via the ePDG 65, which is a device included in the core network (type 1) 90, serving as a gateway. The ePDG 65 has a security function for ensuring security.

Next, each device included in the core network (type 2) 92 will be described briefly.

The PGW_B 32 is connected to the PDN_B 102, the SGW_B 37, the ePDG 65, the WLAN ANa 70, the PCRF 60, and the AAA 55, and is a relay device that forwards user data by functioning as a gateway device between the PDN 102 and the core network 92.

The SGW_B 37 is connected to the PGW_B 32, the MME_B 42, and the LTE AN 80, and is a relay device that forwards user data by functioning as a gateway device between the core network (type 2) 92 and the LTE AN 80.

The MME_B 42 is connected to the SGW_B 37, the LTE AN 80, and the HSS 50, and is an access control device that is responsible for location information management and access control for the UE 10 via the LTE AN 80. The core network (type 2) 92 may be configured to include multiple location management devices. For example, an MME_D may be configured as a location management device different from the MME_B 42. Like the MME_B 42, the MME_D may be connected to the SGW_B 37, the LTE AN 80, and the HSS 50.

Additionally, the MME_D and the MME_B 42 may be connected to each other. This configuration allows the MME_D and the MME_B 42 to transmit/receive the context of the UE 10 to/from each other.

The HSS 50 is connected to the MME_B 42 and the AAA 55 and is a managing node that manages subscriber information. The subscriber information in the HSS 50 is referred to during MME_B 42 access control, for example.

The AAA 55, the PCRF 60 and the ePDG 65 has been already described; thus, the description thereof will be omitted.

Note that in the present specification, the UE 10 connected to each radio access network refers to the UE 10 connected to a base station device, an access point, or the like included in each radio access network, causing data, signals, and the like, which are to be transmitted/received, to go through those base station devices, access points, or the like.

1.2. Device Configuration

Next, the configuration of each device will be described briefly with reference to the drawings.

1.2.1. eNB Block Diagram

FIG. 3A is a block diagram illustrating the eNB 45. As illustrated in FIG. 3A, the eNB 45 is constituted of an IP mobile communication network interface unit 220, a control unit 200, and a storage 240. The IP mobile communication network interface unit 220 and the storage 240 are connected to the control unit 200 via a bus.

The control unit 200 is a function unit for controlling the eNB 45. The control unit 200 reads out and executes various programs stored in the storage 240 to perform various processes.

The IP mobile communication network interface unit 220 is a function unit for the eNB 45 to connect with the UE 10 and the UE B 15, and with the core network (type 1) 90 and the core network (type 2) 92.

The storage 240 stores MME information 242. The MME information 242 contains MMEs to which the eNB 45 can connect. For example, as illustrated in FIG. 3B, the MME information 242 may contain identification information identifying an MME to which the eNB 45 can connect and area information identifying the service area of each MME with the identification information and the area information associated with each other. The example FIG. 3B indicates that different MMEs are stored for each service area and a base station device deployed in each service area can connect to the MMEs associated with that service area. Note that MMEs included in different types of core networks may be stored for the same service area. For example, an MME belonging to a type 1 core network and an MME belonging to a type 2 core network may be stored with both of the MMEs associated with a service area "A".

Here, the MME identification information may be any information capable of identifying an MME, and thus may be a globally unique MME identifier (GUMMEI), for example. The GUMMEI is MME identification information, which includes a public land mobile network (PLMN) that identifies a mobile operator network, an MME group number identifying multiple MMEs, and an MME code identifying an individual MME.

Note that the MME group identity may be an MME group identifier (MMEGI). Note that different MMEGIs for each core network type may be stored. In this case, the core network can be identified by the MME group number. Furthermore, with a core network associated with the MME group number, MMEs belonging to the associated core network may be managed as a group. Thus, in accordance with the MME identification information and the MME group number, the type of core network including the corresponding MMEs may be identified.

Alternatively, type information on the core network may be expressed by an information element independent from the MME identification information. For example, as illustrated in FIG. 3C, the MME information 242 may contain type information that is core network identification information, area information, and MME identification information with all the pieces of information associated with each other. This makes it possible to configure areas based on the core network type. Moreover, an MME deployed in each area can be stored. Furthermore, an MME can be stored for each type of core network. Furthermore, an MME deployed in a specific area of a specific core network can be stored.

Note that the MME identification information may be the GUMMEI, as described above.

With regards to the method for managing the MME identification information, the area information does not necessarily have to be stored, and the core network type and MME identification information may be stored with the core network type and the MME identification information associated with each other.

Note that the area information described thus far may also be tracking area information or routing area information.

The eNB 45 may store UE context information when the UE 10 has attached to a network and is in an active state (connected state) in which a radio resource has been allocated to the UE 10. Note that the UE context information may contain identification information identifying the UE 10. Here, the identification information identifying the UE 10 may be a globally unique temporary identity (GUTI) assigned globally and uniquely to the UE 10. Alternatively, the identification information may be subscriber information such as an international mobile subscriber identity (IMGI). Alternatively, the identification information may be identification information such as a packet temporary mobile subscriber identity (P-TMSI). Alternatively, two or more pieces of the identification information may be combined and be used as the identification information identifying the UE 10.

1.2.2. MME Block Diagram

Next, the configuration of the MME_A 40 will be described. Note that the MME_B 42 has the same configuration and thus detailed descriptions thereof will be omitted.

FIG. 4A is a block diagram illustrating the MME_A 40. As illustrated in FIG. 4A, the MME_A 40 is constituted of an IP mobile communication network interface unit 320, a control unit 300, and a storage 340. The IP mobile communication network interface unit 320 and the storage 340 are connected to the control unit 300 via a bus.

The control unit 300 is a function unit for controlling the MME_A 40. The control unit 300 reads out and executes various programs stored in the storage 340 to perform various processes.

The IP mobile communication network interface unit 320 is a function unit for the MME_A 40 to connect with the eNB 45, the SGW_A 35, the HSS 50, and the like.

As illustrated in FIG. 4A, the storage 340 stores MME information 342 and context information 344.

As illustrated in FIG. 4B, the MME information 342 may contain MME identification information, MME service area information, and core network identification information with all the pieces of information associated with each other.

Here, the MME identification information may be any information capable of identifying the MME, and thus may be a globally unique MME identifier (GUMMEI), for example. The GUMMEI is MME identification information, which includes a public land mobile network (PLMN) that is identification information identifying a mobile operator network, an MME group number identifying multiple MMEs, and an MME code identifying an individual MME.

Note that the MME group number may be an MME group identifier (MMEGI). Note that different MMEGIs for each core network type may be stored. In this case, the core network can be identified by the MME group number. Furthermore, using a core network associated with the MME group number, MMEs belonging to the associated core network may be managed as a group. Thus, on the basis of the MME identification information and the MME group number, the type of core network including the corresponding MMEs may be identified.

In this case, it is only required that the MME information 342 contain the MME identification information and the service area information with both the pieces of information associated with each other. Thus, the MME information 342 do not necessarily have to contain the core network type information.

With regards to the method for managing the MME identification information, the area information does not necessarily have to be stored, and the core network type and MME identification information may be stored with the core network type and the MME identification information associated with each other.

Note that the area information described thus far may also be tracking area information or routing area information.

As illustrated in FIG. 4C, information on UEs stored in the MME, on a UE-by-UE basis, is stored as the context information 344. The UE context information may be one or both of a mobility management (MM) context, which is conventionally stored in an MME, and an evolved packet system (EPS) bearer context.

Note that information identifying a core network, such as type information, may be identification information assigned in accordance with distinction made in order for the core network to be divided from the viewpoint of operation and management by the mobile operator.

Alternatively, the information identifying a core network, such as type information, may be information associated with a type or attribute of a communication terminal. For example, the information may be identification information identifying the core network to which an M2M terminal connects, identification information identifying the core network to which a normal call terminal such as a smartphone connects, or the like.

Alternatively, the information identifying a core network, such as type information, may be identification information associated with a service provided by the mobile operator. For example, information identifying a specific service provided to an M2M terminal and identification information for providing a call service such as IMS may be associated with the information identifying a core network. In this case, the core networks can be configured to be separated by service. Note that managing terminals to which services are provided on a service-by-service basis makes it possible to classify the core networks for each terminal to which a corresponding service is provided.

The context information 344 may contain the identification information identifying the UE. Here, the identification information identifying the UE 10 may be a globally unique temporary identity (GUTI) assigned globally and uniquely to the UE 10. Alternatively, the identification information may be subscriber information such as an international mobile subscriber identity (IMGI). Alternatively, the identification information may be identification information such as a packet temporary mobile subscriber identity (P-TMSI). Alternatively, two or more pieces of the above described identification information may be combined to be the identification information identifying the UE 10.

Note that the MME_A 40 may store the context information when the UE 10 has attached to a network. In other words, the context information may be generated upon the attach.

1.3. Description of Processing

Next, a procedure for changing a core network will be described.

1.3.1 First Procedure Example

First, a first procedure example for changing a core network to which the UE 10 is connected will be described. In the initial state of the procedure, the UE 10 has a connection to the core network (type 1) 90. More specifically, the UE 10 has a connection to the eNB 45. In addition, the UE 10 has a connection to the MME_A 40 via the eNB 45. Moreover, the UE 10 has a PDN connection established with the PGW_A 30. Here, the PDN connection refers to a communication path for delivering user data.

Note that the core network (type 1) 90 and the core network (type 2) 92 may both have different PGWs deployed therein. For example, the core network (type 1) 90 may be configured to include the PGW_A 30 and the core network (type 2) 92 may be configured to include the PGW_B 32.

Furthermore, the core network (type 1) 90 and the core network (type 2) 92 may both have different SGWs deployed therein. For example, the core network (type 1) 90 may be configured to include the SGW_A 35 and the core network (type 2) 92 may be configured to include the SGW_B 37.

The first procedure example will be described on the assumption that the UE 10 has a PDN connection established with the PGW_A 30 in the initial state. Specifically, the PDN connection between the UE 10 and the PGW_A 30 is established via the SGW_A 35.

Note that, in the first procedure example, the identification information identifying the UE 10 may be a globally unique temporary identity (GUTI) assigned globally and uniquely to the UE 10. Alternatively, the identification information may be subscriber information such as an international mobile subscriber identity (IMGI). Alternatively, the identification information may be identification information such as a packet temporary mobile subscriber identity (P-TMSI). Alternatively, two or more pieces of the identification information may be combined to be the identification information identifying the UE 10.

Furthermore, in the first procedure example, the identification information identifying an MME may be a globally unique MME identifier (GUMMEI) that corresponds to each MME. Note that the GUMMEI is globally unique identification information including information such as a PLMN, an MME group, and an MME code. Alternatively, the identification information identifying an MME may be an MME group identifier (MMEGI) identifying an MME group.

Note that the eNB 45 retains in advance an MMEGI and a GUMMEI that belongs to an MME group identified by the MMEGI with the MMEGI and the GUMMEI associated with each other. Thus, upon receiving an MMEGI, the eNB 45 can select a GUMMEI that belongs to the received MMEGI in accordance with the MMEGI.

For example, the eNB 45 may store in advance, in MME information, an MMEGI corresponding to a group of MMEs that belong to the core network (type 2) and GUMMEIs corresponding to MMEs such as the MME_B 42 that belong to the group with the MMEGI and the MMEGI associated with each other.

Figure 5:
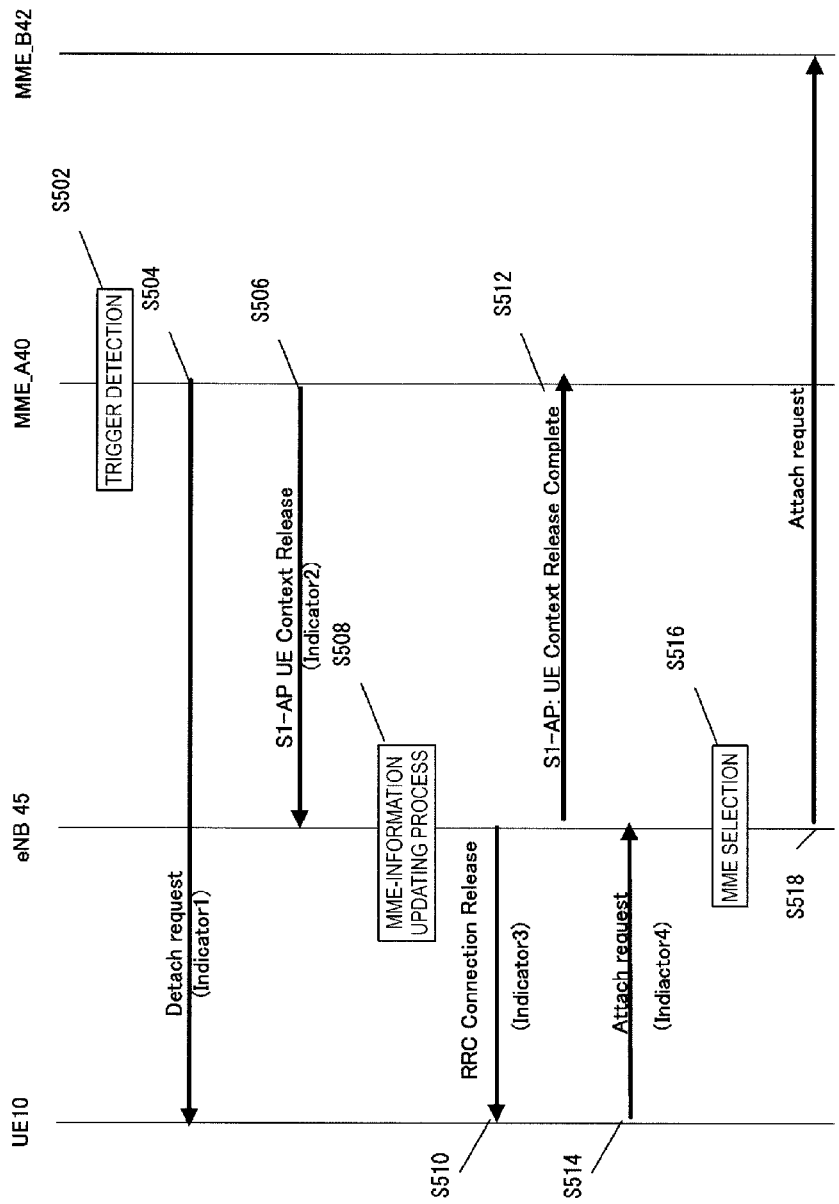
FIG. 5 is a diagram illustrating a first procedure according to an embodiment.

Specific steps of the first procedure example will be described below with reference to FIG. 5.

First, the MME_A 40 detects a trigger for starting the procedure for changing a core network to which the UE 10 is connected (S502).

The MME_A 40 may detect the trigger in response to an update of the subscriber information. More specifically, upon a change in subscriber information stored in the HSS 50 that correspond to the UE 10, the HSS 50 transmits, to the MME_A 40, a control message including identification information indicating that the change has been made. The MME_A 40 may detect that the core network to which the UE 10 is connected needs to be changed, upon receiving the control message transmitted by the HSS 50 or based on the identification information included in the control message.

Furthermore, the identification information included in the control message may be information on a core network indicating the core network type 2, or may be information such as a flag indicating a request to change a core network type. In addition, the control message may be a control message for requesting to switch a core network. Moreover, the control message may contain identification information identifying the UE 10.

The eNB 45 may receive an MMEGI corresponding to a group of MMEs that belong to the core network (type 2), and perform an MME selecting process. Note that the eNB 45 may select the MME_B 42 based on the received MMEGI.

The MME_A 40 may detect a trigger in response to an event that the core network (type 2) 92 has been configured to. More specifically, the procedure may be triggered by installation of a control device, such as the MME_B 42 or the PGW_B 32, included in the core network (type 2) 92. Note that the operator of the core network may install such a control device, and manually operate the MME_A 40 after the installation. The MME_A 40 may detect a trigger in response to such manual operation by the operator.

Next, the MME_A 40 transmits a detach request message to the UE 10 upon the detection of the trigger (S504).

Here, the MME_A 40 may transmit the detach request message with at least first indication information (Indicator 1) included in the detach request message.

Note that the first indication information may be information giving a request or an instruction for switching core networks.

Alternatively, the first indication information may be a core network type. Note that the core network type may be information identifying the core network (type 2). Specifically, the core network type may be network resource identifiers (NRIs) identifying the core network (type 2) 92.

Alternatively, the first indication information may be information indicating that a core network type will be switched. More specifically, the information indicating that the core network type will be switched may be a cause value indicating that a core network needs to be switched.

Alternatively, the first indication information may be information indicating that the UE 10 needs to be reattached. More specifically, the information indicating that the UE 10 needs to be re-attached may be a cause value indicating Attach Required.

Alternatively, the first indication information may be identification information identifying an MME. Here, the identification information identifying an MME may be information identifying an MME included in the core network (type 2) 92. In addition, the identification information identifying an MME may be a GUMMEI identifying the MME_B 42. Moreover, the identification information identifying an MME may be an MMEGI identifying a group of MMEs included in the core network (type 2) 92.

Alternatively, the first indication information may be information obtained by combining two or more of: the information giving a request or an instruction for switching core networks; the core network type; the information indicating that a core network type will be switched; the information indicating that re-attach is necessary; and the identification information identifying an MME, each of which has been described above. In addition, the first indication information obtained by combining two or more pieces of information as described above may be used as the core network type, the information indicating that a core network type is to be switched, the information indicating that re-attach is necessary, or the identification information identifying an MME.

Furthermore, the MME_A 40 may transmit a UE context release message to the eNB 45, in parallel with transmission of the detach request message or after transmission of the detach request message (S506). When a radio resource has been allocated between the UE 10 and the eNB 45, the MME_A 40 may use the UE context release message to request the release of the radio resource.

Here, the MME_A 40 may transmit the UE context release message with at least second indication information (Indicator 2) included in the UE context release message.

The second indication information may be a request or an instruction for switching core networks.

Alternatively, the second indication information may be a core network type. Note that the core network type may be information identifying the core network (type 2). Specifically, the core network type may be network resource identifiers (NRIs) identifying the core network (type 2) 92.

Alternatively, the second indication information may be information indicating that a core network type will be switched. More specifically, the information indicating that the core network type will be switched may be a cause value indicating that a core network needs to be switched.

Alternatively, the second indication information may be information indicating that the UE 10 needs to be re-attached. More specifically, the information indicating that the UE 10 needs to be re-attached may be a cause value indicating Attach Required.

Alternatively, the second indication information may be identification information identifying an MME. Here, the identification information identifying an MME may be information identifying an MME included in the core network (type 2) 92. In addition, the identification information identifying an MME may be a GUMMEI identifying the MME_B 42. Moreover, the identification information identifying an MME may be an MMEGI identifying a group of MMEs included in the core network (type 2) 92.

Alternatively, the second indication information may be information obtained by combining two or more of: the information giving a request or an instruction for switching core networks; the core network type; the information indicating that a core network type will be switched; the information indicating that re-attach is necessary; and the identification information identifying an MME, each of which has been described above. In addition, the second indication information obtained by combining two or more pieces of information as described above may be used as the core network type, the information indicating that a core network type will be switched, the information indicating that re-attach is necessary, or the identification information identifying an MME.

The MME_A 40 may transmit a UE context release message with at least the identification information identifying the UE 10 and a timer value included in the UE context release message. Note that the timer value may be a value of a timer used by the eNB 45 to select an MME.

Next, the eNB 45 receives the UE context release message from the MME_A 40. The eNB 45 may perform an MME-information updating process based on the information included in the UE context release message (S508). More specifically, the eNB 45 may perform the MME-information updating process based on the second indication information.

Note that the MME-information updating process may be a process in which MME information is updated in a manner such that the eNB 45 selects an MME included in the core network (type 2) 92, at the time of MME selection performed upon reception of an attach request message transmitted by the UE 10.

More specifically, in the MME-information updating process, the eNB 45 may store the identification information identifying the UE 10 and the second indication information in association with each other.

Furthermore, having acquired the second indication information, the eNB 45 may retain the UE context information without deleting it. On the other hand, when the second indication information has not been acquired, the eNB 45 may delete the UE context information.

Furthermore, the eNB 45 may start a timer based on the reception of the second indication information. While the timer is in operation, the eNB 45 may retain the updated MME information or the UE context. In addition, when the timer expires or the timer stops for some reason, the eNB 45 may delete the updated MME information or the UE context.

Here, a value retained in advance by the eNB 45 may be used as a value for the timer, or a timer value included in the UE context release message may be used.

Note that the eNB 45 may still retain information on an MME that the eNB 45 has already retained before the MME-information updating process is performed. For example, the eNB 45 may still retain the GUMMEI corresponding to the MME_A 40 included in the core network (type 1) 90, the MMEGI indicating a group of MMEs to which the MME_A 40 belongs, and the like. The MME-information updating process is completed through above-described steps.

The eNB 45 may transmit an RRC connection release message to the UE 10 upon reception of the UE context release message or completion of the MME-information updating process (S510). The eNB 45 may release a radio resource allocated to the UE 10 upon transmission of the UE context release message.

Alternatively, the eNB 45 may transmit the UE context release message with information, such as Acknowledge mode set to 1 that requires a response included in the UE context release message. In this case, the UE 10 transmits, to the eNB 45, a response to the UE context release message as a response to the UE context release message. Upon reception of the response message, the eNB 45 may release a radio resource allocated to the UE 10.

Note that when the timer is in operation at the time when the UE context release message is transmitted or the response message is received, the eNB 45 may retain the context of the UE 10 including, for example, the identification information identifying the UE 10. Alternatively, although the eNB 45 deletes the UE context, the eNB 45 may store the identification information identifying the UE 10 and the second indication information with the identification information and the second indication information associated with each other while the timer is in operation.

Note that the eNB 45 may transmit the RRC connection release message with at least third indication information (Indicator 3) included in the RRC connection release message.

The third indication information may be information triggering a request or an instruction for switching core networks.

Alternatively, the third indication information may be identification information indicating that the UE 10 is requested or instructed to be re-attached. Specifically, the identification information requesting reattach may be a cause value indicating Attach Required.

Alternatively, the third indication information may be identification information indicating that a tracking area update procedure is necessary for the UE 10. Specifically, the identification information indicating that the tracking area update procedure is necessary may be a cause value indicating TAU Require.

Alternatively, the third indication information may be identification information indicating that a core network needs to be switched. Specifically, the identification information indicating that a core network needs to be switched may be a core network type identifying the core network (type 2) 92.

The core network type may be network resource identifiers (NRIs) identifying the core network (type 2) 92. Alternatively, the identification information may be information that does not indicate a specific MMEGI or NRI by using MMEGI or NRI having zero or other specific value, such as NULL-MMEGI or NULL-NRI.

Alternatively, the third indication information may be identification information identifying an MME. Here, the identification information identifying an MME may be information identifying an MME included in the core network (type 2) 92. In addition, the identification information identifying an MME may be a GUMMEI identifying the MME_B 42. Moreover, the identification information identifying an MME may be an MMEGI identifying a group of MMEs included in the core network (type 2) 92.

Alternatively, the third indication information may be information obtained by combining two or more of: the information triggering a request or an instruction for switching core networks; the identification information indicating that the UE 10 is requested to be re-attached; the identification information indicating that a tracking area update procedure is necessary for the UE 10; the identification information indicating that a core network needs to be switched; and the identification information identifying an MME, each of which has been described above. The third indication information obtained by combining two or more pieces of information as described above may be used as the identification information indicating that the UE 10 is requested to be reattached, the identification information indicating that a tracking area update procedure is necessary for the UE 10, the identification information indicating that a core network needs to be switched, or the identification information identifying an MME.

Next, the eNB 45 transmits, to the MME_A 40, a context release complete message as a response to the UE context release message (S512). The context release complete message is a response message to the UE context release message. When the eNB 45 has performed the release of a radio resource of the UE 10, deletion of the context of a UE, or the like, the context release complete message serves as a message that notifies that these processes are completed.

Furthermore, the eNB 45 may perform the MME-information updating process upon acquisition of the second indication information, and when the eNB 45 retains the MME information and the like through the MME-information updating process, the eNB 45 may transmit the UE context release complete message with information indicating that the UE context or the MME information on the core network (type 2) 92 is retained in the UE context release complete message.

Furthermore, the MME_A 40 may receive the UE context release complete message, and delete the UE context that the MME_A 40 retains.

Furthermore, upon receiving the detach request message, the UE 10 may start an attach procedure. Note that the UE 10 may start the attach procedure based on the first indication information. In this case, the UE 10 may start the attach procedure even if the UE 10 has not received the RRC connection release message.

Alternatively, the UE 10 may start the attach procedure after receiving the RRC connection release message.

For example, the UE 10 may start the attach procedure upon reception of the first indication information and the RRC connection release message. Alternatively, the UE 10 may start the attach procedure based on the third indication information. Alternatively, the UE 10 may start the attach procedure based on the first indication information and the third indication information.

Furthermore, the UE 10 may delete the retained information on an MME, upon reception of the first indication information or the second indication information, or reception of both the first indication information and the second indication information. The information on an MME to be deleted may be a GUMMEI for the MME_A 40. Alternatively, the information on an MME to be deleted may be MMEGI indicating a group to which the MME_A 40 belongs. As described above, the first indication information or the second indication information may be used as information indicating that old information on an MME has been deleted.

Next, the attach procedure will be described. The UE 10 transmits an attach request message to the eNB 45 to start the attach procedure (S514). The UE 10 transmits the attach request message to make a request for connection to a core network again. Note that the UE 10 may transmit the attach request message with the identification information identifying the UE included in the attach request message.

Here, the UE 10 may transmit the attach request message with at least fourth indication information (Indicator 4) included in the attach request message. Note that the UE 10 may decide to include the fourth indication information on the basis of reception of one or both of the first indication information and the third indication information.

The fourth indication information may be information giving a request or an instruction for switching core networks.

Alternatively, the fourth indication information may be a core network type. Note that the core network type may be information identifying the core network (type 2). Specifically, the core network type may be network resource identifiers (NRIs) identifying the core network (type 2) 92.

Alternatively, the fourth indication information may be identification information indicating that a core network needs to be switched. Specifically, the identification information indicating that a core network needs to be switched may be a core network type identifying the core network (type 2) 92. The identification information may be network resource identifiers (NRIs) identifying the core network (type 2) 92. Alternatively, the identification information may be information that does not indicate a specific MMEGI or NRI by using MMEGI or NRI having zero or other specific value, such as NULL-MMEGI or NULL-NRI.

Alternatively, the fourth indication information may be identification information identifying an MME. Here, the identification information identifying an MME may be information identifying an MME included in the core network (type 2) 92. In addition, the identification information identifying an MME may be a GUMMEI identifying the MME_B 42. Moreover, the identification information identifying an MME may be an MMEGI identifying a group of MMEs included in the core network (type 2) 92.

Alternatively, the fourth indication information may be information obtained by combining two or more of: the information giving a request or an instruction for switching core networks; the core network type; the identification information indicating that the core network needs to be switched; and the identification information identifying an MME, each of which has been described above. In addition, the second indication information obtained by combining two or more pieces of information as described above may be used as the core network type, the information indicating that a core network type is to be switched, the information indicating that re-attach is necessary, or the identification information identifying an MME.

Furthermore, the UE 10 does not necessarily have to transmit the fourth indication information with the fourth indication information included in the attach request message. The UE 10 may transmit the fourth indication information with the fourth indication information included in the control message to be transmitted by the UE 10 in the attach procedure.

The eNB 45 receives the attach request message from the UE 10. The eNB 45 performs the MME selecting process upon reception of the attach request message (S516).

In the MME selecting process, the eNB 45 selects the MME_B 42 on the basis of the MME-information updating process.

Alternatively, the eNB 45 may select the MME_B 42 based on the fourth indication information. As described above, when not having received the fourth indication information, the eNB 45 may select the MME_A 40.

Alternatively, the eNB 45 may select the MME_B 42 on the basis of the MME-information updating process and reception of the fourth indication information. As described above, even when the MME selection on the basis of the MME-information updating process results in MME_B 42, the eNB 45 may select the MME_A 40 when not having received the fourth indication information. In addition, even when the fourth indication information has already been received, the eNB 45 may select the MME_A 40 when having not performed the MME-information updating process.

As described above, the eNB 45 can select either the MME_A 40 included in the core network (type 1) 90 or the MME_B 42 included in the core network (type 2) 92 based on one or both of the second indication information and the fourth indication information.

Note that the eNB 45 may select an MME included in the core network (type 2) 92 when a timer is in operation, and may select an MME included in the core network (type 1) based on information transmitted by the UE 10 when the timer is not in operation or a core network need not be switched.

As for the selection method in such a case, selection may be made in accordance with information transmitted by the UE 10. For example, the UE 10 transmits the attach request message with information identifying an MME such as a GUMMEI included in the attach request message. When the received MME is available, the eNB may select the MME. Here, the eNB 45 may decide whether the MME is available on the basis of whether the MME has connectivity. In the present embodiment, the information transmitted by the UE 10 may be information identifying the MME_A 40 that has performed location management of the UE 10.

When the MME received from the UE 10 is not available, the UE 10 may transmit the attach request message with identification information identifying a group of MMEs such as an MMEI, identification information identifying the UE 10 such as P-TMSI, location information such as tracking area ID (TAI) and tracking area code (TAC), or any information obtained by combining two or more pieces of the information described above included in the attach request message. The eNB 45 may receive these pieces of information, and select an MME based on these pieces of information.

Thus, the eNB 45 completes the MME selecting process.

Note that the eNB 45 may decide whether to perform the MME selecting process, on the basis of a timer initiated in unison with the MME-information updating process. For example, when the timer is counting, the MME selecting process may be performed, and after the timer has stopped or when the timer is not counting, the MME selecting process need not be performed.

More specifically, the eNB 45 may select the MME_B 42 when the timer is in operation, and may select the MME_A 40 when the timer is not in operation. Note that, when the timer is not in operation, the eNB 45 may select an MME based on the identification information identifying an MME included in the attach request. For example, the eNB 45 may select an MME identified by the GUMMEI included in the attach request message, or may select an MME based on the MMEGI included in the attach request message, or may select a default MME. Note that, in this case, the eNB 45 may select the MME_A 40.

Note that the eNB 45 may stop the timer upon receiving the attach request message transmitted by the UE 10.

Furthermore, when a terminal device that has not performed the MME-information updating process transmits the attach request message, the eNB 45 may select an MME based on the identification information identifying an MME included in the attach request. For example, the eNB 45 may select an MME identified by the GUMMEI included in the attach request message, or may select an MME based on the MMEGI included in the attach request message, or may select an MME based on the MMEGI included in the attach request message, or may select a default MME. Note that, in this case, the eNB 45 may select the MME_A 40.

Next, when the eNB 45 has selected the MME_B 42, the eNB 45 transmits the attach request message to the MME_B 42 (S518). Note that the attach procedure after transmission of the attach request message may be transmitting and/or receiving of control messages and processes similar to those in conventional attach procedures. Thus, detailed description thereof will be omitted.

Furthermore, when the eNB 45 selects the MME_A 40, the eNB 45 may transmit the attach request message to the MME_A 40. In addition, the eNB 45 may receive a route reconfiguration request from the MME_A 40. Moreover, the eNB 45 may select the MME_B 42 in accordance with the route reconfiguration request, and transmit the attach request message to the MME_B 42. Note that the attach procedure after transmission of the attach request message may involve transmitting and/or receiving of control messages and processes similar to those in conventional attach procedures. Thus, detailed description thereof will be omitted.

As descried above, when the eNB 45 has selected the MME_B 42 through the MME selecting process, it is possible, for example, to perform the attach procedure without receiving a reroute reconfiguration request, and hence, transmitting and/or receiving of the control messages or other processes can be reduced.

Note that the MME_B 42 receives the attach request message from the eNB 45, and selects an SGW and a PGW. Here, the MME_B 42 may select the SGW_B 37 and the PGW_B 32 for the core network (type 2) 92, and establish a PDN connection between the UE 10 and the PGW_B 32.

Through the attach procedure, the UE 10 establishes a PDN connection with the PGW_B 32. In addition, the PDN connection between the UE 10 and the PGW_B 32 is established via the SGW_B 37. Moreover, with the established PDN connection, the UE 10 can transmit/receive user data to/from a communication device included in the PDN_B 102.

Figure 6:
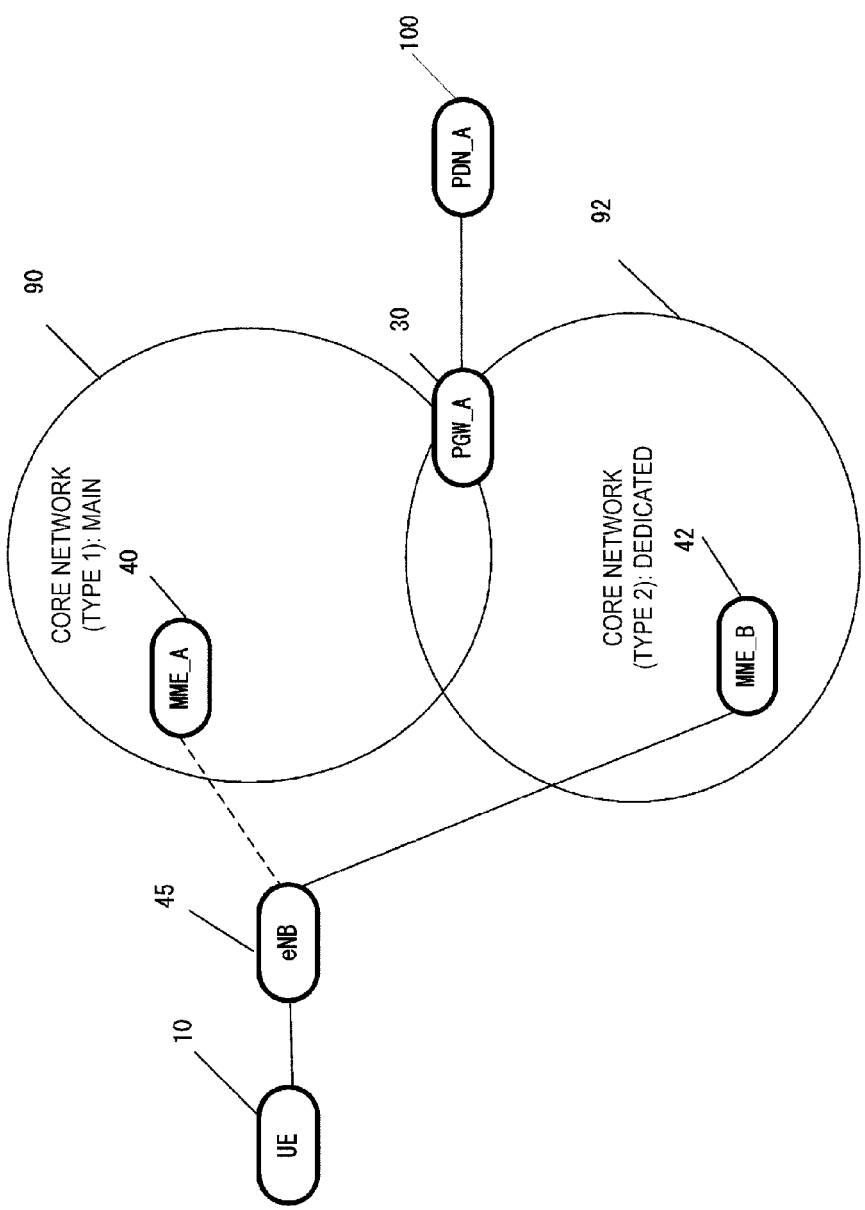
FIG. 6 is a diagram illustrating a configuration example of the mobile communication system.

Note that it has been described that the core network (type 1) 90 and the core network (type 2) 92 are connected to the PDN_A 100 and PDN_B 102, respectively, in the present procedure. However, as illustrated in FIG. 6, the PDN_A 100 and the PDN_B 102 may be the same network (PDN 100). In this case, the PGW_A 30 and the PGW_B 32 may be the same device (PGW_A 30).

In other words, with the present procedure, the UE 10 changes an MME that performs movement control from the MME_A 40 to the MME_B 42. In addition, a new PDN connection may be established without changing a PGW serving as an end point of a PDN connection. Moreover, in the attach procedure described through the present procedure, the MME_B 42 may select the PGW_A 30 serving as an end point of a PDN connection that the UE 10 established in the past. With this selection, the UE 10 may establish a PDN connection with the PGW_A 30.

1. 3. 2 Second Procedure Example

Next, a second procedure example for changing a core network to which the UE 10 is connected will be described. The initial state of the procedure may be the same as the initial state described in the first procedure example.

In the initial state, the UE 10 has established a connection to the core network (type 1) 90. More specifically, the UE 10 has established a connection to the eNB 45. In addition, the UE 10 has a connection to the MME_A 40 via the eNB 45. Moreover, the UE 10 has a PDN connection established with the PGW_A 30. Here, the PDN connection refers to a communication path for delivering user data.

Note that the core network (type 1) 90 and the core network (type 2) 92 may have mutually different PGWs deployed therein. For example, the core network (type 1) 90 may be configured to include the PGW_A 30, and the core network (type 2) 92 may be configured to include the PGW_B 32.

Furthermore, SGWs different from each other may be deployed in the core network (type 1) 90 and in the core network (type 2) 92. For example, the core network (type 1) 90 may be configured to include the SGW_A 35, and the core network (type 2) 92 may be configured to include the SGW_B 37.

The second procedure example will be described on the assumption that the UE 10 has a PDN connection established with the PGW_A 30 in the initial state. In addition, the PDN connection between the UE 10 and the PGW_A 30 is established via the SGW_A 35.

Note that, in the second procedure example, the identification information identifying the UE 10 may be a globally unique temporary identity (GUTI) assigned globally and uniquely to the UE 10. Alternatively, the identification information may be subscriber information such as an international mobile subscriber identity (IMGI). Alternatively, the identification information may be identification information such as a packet temporary mobile subscriber identity (P-TMSI). Alternatively, two or more pieces of the identification information may be combined to comprise the identification information identifying the UE 10.

Furthermore, in the second procedure example, the identification information identifying an MME may be a globally unique MME identifier (GUMMEI) that corresponds to each MME. Note that the GUMMEI is globally unique identification information including information such as a PLMN, an MME group, and an MME code. Alternatively, the identification information identifying an MME may be an MME group identifier (MMEGI) identifying an MME group.

Note that the eNB 45 retains in advance an MMEGI and a GUMMEI that belongs to an MME group identified by the MMEGI with the MMEGI and the GUMMEI associated with each other. Thus, upon receiving an MMEGI, the eNB 45 can select a GUMMEI that belongs to the received MMEGI based on the MMEGI.

For example, the eNB 45 may store in advance, in the MME information, an MMEGI corresponding to a group of MMEs that belong to the core network (type 2) and GUMMEIs corresponding to MMEs such as the MME_B 42 that belong to the group of MMEGI with the MMEGI and the GUMMEI associated with each other.

Figure 7:
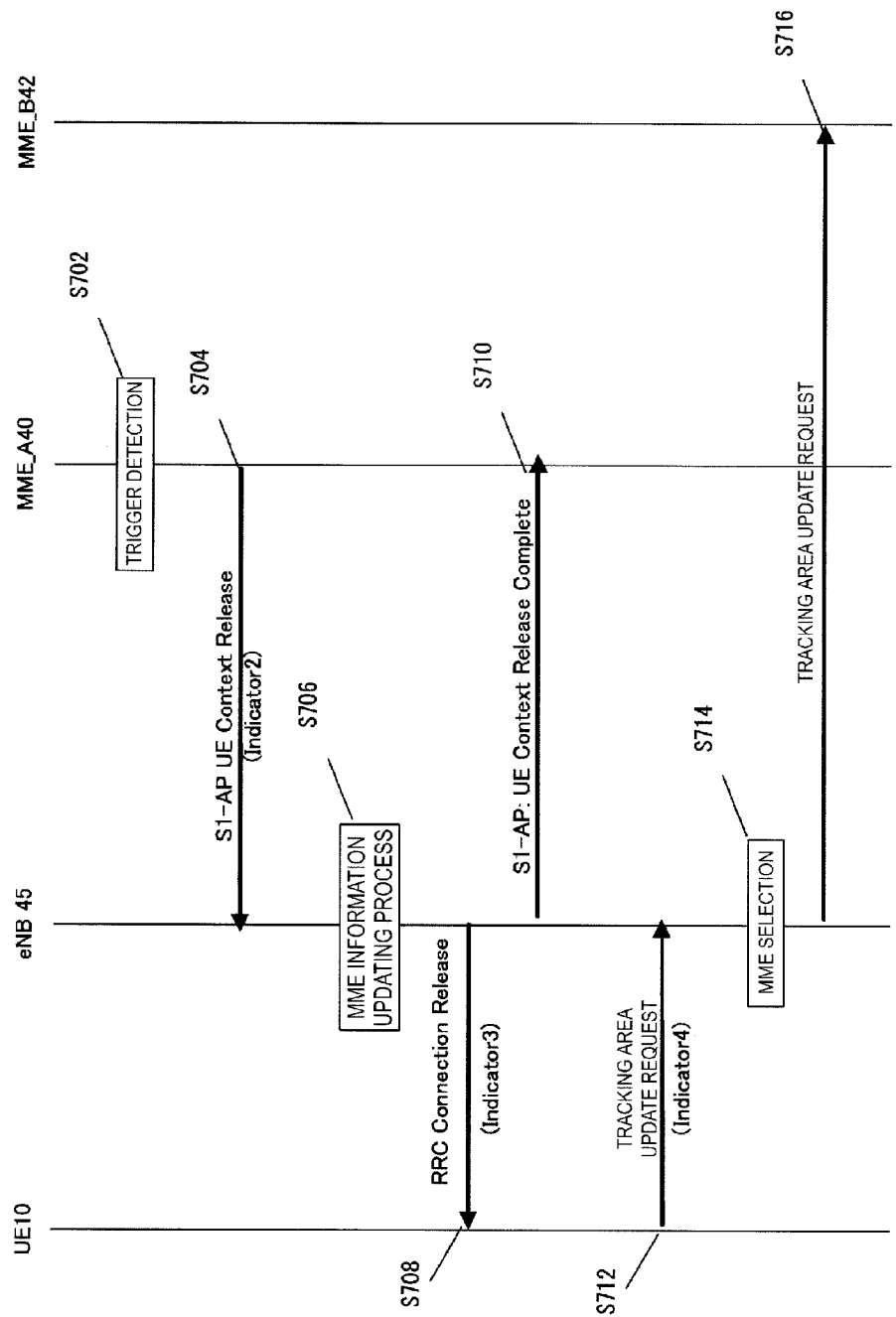
FIG. 7 is a diagram illustrating a second procedure according to the embodiment.

Specific steps of the second procedure example will be described below with reference to FIG. 7.

First, the MME_A 40 detects a trigger for starting the procedure of changing the core network to which the UE 10 is connected (S702).

Note that the trigger detection process may be the same as the trigger detection process (S502) described in the first procedure example. The trigger detection process will be described below.

The MME_A 40 may detect the trigger in response to an update of the subscriber information. More specifically, upon a change in subscriber information stored in the HSS 50 that also corresponds to the UE 10, the HSS 50 transmits, to the MME_A 40, a control message including identification information indicating that the change has been made. The MME_A 40 may detect that the core network to which the UE 10 is connected needs to be changed, upon reception of the control message transmitted by the HSS 50 or based on the identification information included in the control message.

Furthermore, the identification information included in the control message may be information on a core network indicating the core network type 2, or may be information such as a flag indicating a request to change a core network type. In addition, the control message may be a request to switch a core network. Moreover, the control message may include identification information identifying the UE 10.

The eNB 45 may receive an MMEGI corresponding to a group of MMEs that belong to the core network (type 2), and perform an MME selecting process. Note that the eNB 45 may select the MME_B 42 based on the received MMEGI.

The MME_A 40 may detect a trigger in response to an event in which the core network (type 2) 92 has been configured. More specifically, the procedure may be triggered by installation of a control device, such as the MME_B 42 or the PGW_B 32, included in the core network (type 2) 92. Note that the operator of the core network may install such a control device, and manually operate the MME_A 40 after installation. The MME_A 40 may detect a trigger in response to such manual operation by the operator.

Next, the MME_A 40 may transmit a UE context release message to the eNB 45 upon the detection of the trigger (S704). When a radio resource has been allocated between the UE 10 and the eNB 45, the MME_A 40 may use the UE context release message to request the release of the radio resource.

Here, the MME_A 40 may transmit the UE context release message with at least second indication information (Indicator 2) included in the UE context release message.

Note that the second indication information may be information giving a request or an instruction for switching core networks.

Alternatively, the second indication information may be a core network type. Note that the core network type may be information identifying the core network (type 2). More specifically, the core network type may be network resource identifiers (NRIs) identifying the core network (type 2) 92.

Alternatively, the second indication information may be information indicating that a core network type will be switched. More specifically, the information indicating that the core network type will be switched may be a cause value indicating that a core network needs to be switched.

Alternatively, the second indication information may be information indicating that the UE 10 needs to be re-attached. More specifically, the information indicating that the UE 10 needs to be re-attached may be a cause value indicating Attach Required.

Alternatively, the second indication information may be identification information identifying an MME. Here, the identification information identifying an MME may be information identifying an MME included in the core network (type 2) 92. In addition, the identification information identifying an MME may be a GUMMEI identifying the MME_B 42. Moreover, the identification information identifying an MME may be an MMEGI identifying a group of MMEs included in the core network (type 2) 92.

Alternatively, the second indication information may be information obtained by combining two or more of: the information giving a request or an instruction for switching core networks; the core network type; the information indicating that a core network type will be switched; the information indicating that re-attach is necessary; and the identification information identifying an MME, each of which has been described above. In addition, the second indication information obtained by combining two or more pieces of information as described above may be used as the core network type, the information indicating that a core network type will be switched, the information indicating that re-attach is necessary, or the identification information identifying an MME.

The MME_A 40 may transmit a transmission UE context release message with at least the identification information identifying the UE 10 and a timer value included in the transmission UE context release message. Note that the timer value may be a value of a timer used by the eNB 45 to select an MME.

Next, the eNB 45 receives the UE context release message from the MME_A 40. The eNB 45 may perform an MME-information updating process based on the information included in the UE context release message (S706). More specifically, the eNB 45 may perform the MME-information updating process based on the second indication information.

Note that the MME-information updating process may be a process in which MME information is updated in a manner such that the eNB 45 selects an MME included in the core network (type 2) 92, at the time of MME selection performed upon reception of a tracking area update request message transmitted by the UE 10.

More specifically, in the MME-information updating process, the eNB 45 may store the identification information identifying the UE 10 and the second indication information in association with each other.

Furthermore, after having acquired the second indication information, the eNB 45 may still retain the UE context information without deleting the UE context information. On the other hand, when not having acquired the second indication information, the eNB 45 may delete the UE context information.

Furthermore, the eNB 45 may start a timer to measure time progression based on the reception of the second indication information. While the timer is in operation, the eNB 45 may retain the updated MME information or the UE context. In addition, when the timer expires or the timer stops for some reason reason, the eNB 45 may delete the updated MME information or the UE context.

Here, a value retained in advance by the eNB 45 may be used as the value for the timer, or a timer value included in the UE context release message may be used.

Note that the eNB 45 may still retain information on an MME that the eNB 45 has already retained before the MME-information updating process is performed. For example, the eNB 45 may still retain the GUMMEI corresponding to the MME_A 40 included in the core network (type 1) 90, the MMEGI indicating a group of MMEs to which the MME_A 40 belongs, and the like.

The MME-information updating process is completed through the above-described steps.

The NB 45 may transmit an RRC connection release message to the UE 10 upon reception of the UE context release message or completion of the MME-information updating process (S708). The eNB 45 may release a radio resource allocated to the UE 10 upon transmission of the UE context release message.

Alternatively, the eNB 45 may transmit the UE context release message with information, corresponding to, for example, Acknowledge mode set to 1, that requires a response included in the UE context release message. In this case, the UE 10 transmits, to the eNB 45, a response to the UE context release message as a response to the UE context release message. Upon reception of the response message, the eNB 45 may release a radio resource allocated to the UE 10.

Note that when the timer is in operation at the time when the UE context release message is transmitted or the response message is received, the eNB 45 may retain the context of the UE 10 including, for example, the identification information identifying the UE 10. Alternatively, although the eNB 45 deletes the UE context, the eNB 45 may store the identification information identifying the UE 10 and the second indication information in association with each other while the timer is in operation.

Note that the eNB 45 may transmit the RRC connection release message with at least third indication information (Indicator 3) included in the RRC connection release message.

The third indication information may be information triggering a request or an instruction for switching core networks.

Alternatively, the third indication information may be identification information indicating that the UE 10 is requested to be re-attached. Specifically, the identification information requesting re-attach may be a cause value indicating Attach Required.

Alternatively, the third indication information may be identification information indicating that a tracking area update procedure is necessary for the UE 10. Specifically, the identification information indicating that the tracking area update procedure is necessary may be a cause value indicating TAU Required.

Alternatively, the third indication information may be identification information indicating that a core network needs to be switched. Specifically, the identification information indicating that a core network needs to be switched may be a core network type identifying the core network (type 2) 92. The identification information may be network resource identifiers (NRIs) identifying the core network (type 2) 92. Alternatively, the identification information may be information that does not indicate a specific MMEGI or NRI by using MMEGI or NRI having zero or other specific value, such as NULL-MMEGI or NULL-NRI.

Alternatively, the third indication information may be identification information identifying an MME. Here, the identification information identifying an MME may be information identifying an MME included in the core network (type 2) 92. In addition, the identification information identifying an MME may be a GUMMEI identifying the MME_B 42. Moreover, the identification information identifying an MME may be an MMEGI identifying a group of MMEs included in the core network (type 2) 92.

Alternatively, the third indication information may be information obtained by combining two or more of: the information triggering a request or an instruction for switching core networks; the identification information indicating that the UE 10 is requested to be re-attached; the identification information indicating that a tracking area update procedure is necessary for the UE 10; the identification information indicating that a core network needs to be switched; and the identification information identifying an MME, each of which has been described above. The third indication information obtained by combining two or more pieces of information as described above may be used as the identification information indicating that the UE 10 is requested to be re-attached, the identification information indicating that a tracking area update procedure is necessary for the UE 10, the identification information indicating that a core network needs to be switched, or the identification information identifying an MME.

Next, the eNB 45 transmits, to the MME_A 40, a context release complete message as a response to the UE context release message (S710). The context release complete message is a response message to the UE context release message. When the eNB 45 has performed release of a radio resource for the UE 10, deletion of a context of a UE, or the like, the context release complete message serves as a message that notifies that these processes are completed.

Furthermore, the eNB 45 may perform the MME-information updating process upon acquisition of the second indication information, and when the eNB 45 retains the MME information and the like through the MME-information updating process, the eNB 45 may transmit the UE context release complete message with information indicating that the UE context or the MME information on the core network (type 2) 92 is retained included in the UE context release complete message.

Furthermore, the MME_A 40 may receive the UE context release complete message, and delete the UE context that the MME_A 40 retains.

The UE 10 may receive the RRC connection release, and start the tracking area update procedure. Note that the UE 10 may start the tracking area update procedure based on the third indication information. Alternatively, the UE 10 may start the tracking area update procedure upon expiration of a tracking area update timer counting transmission interval of tracking area update requests.

Furthermore, the UE 10 may delete the retained information on an MME, upon reception of the first indication information. The information on an MME to be deleted may be a GUMMEI for the MME_A 40. Alternatively, the information on an MME to be deleted may be an MMEGI indicating a group to which the MME_A 40 belongs. As described above, the first indication information or the second indication information may be used as information indicating that old information on an MME has been deleted.

Next, the tracking area update procedure will be described. The UE 10 transmits a tracking area update request message to the eNB 45 to start the tracking area update procedure (S712). The UE 10 transmits the tracking area update message to request confirmation or update of a tracking area in which the UE 10 is located.

Here, the UE 10 may transmit the tracking area update message with at least the identification information identifying the UE included in the tracking area update message.

In addition, the UE 10 may transmit the attach request message with at least fourth indication information (Indicator 4) included in the attach request message. Note that the UE 10 may decide to include the fourth indication information based on the third indication information.

The fourth indication information may be information giving a request or an instruction for switching core networks.

Alternatively, the fourth indication information may be a core network type. Note that the core network type may be information identifying the core network (type 2). Specifically, the core network type may be network resource identifiers (NRIs) identifying the core network (type 2) 92.

Alternatively, the fourth indication information may be identification information indicating that a core network needs to be switched. Specifically, the identification information indicating that a core network needs to be switched may be a core network type identifying the core network (type 2) 92. The identification information may be network resource identifiers (NRIs) identifying the core network (type 2) 92. Alternatively, the identification information may be information that does not indicate a specific MMEGI or NRI by using MMEGI or NRI having zero or other specific value, such as NULL-MMEGI or NULL-NRI.

Alternatively, the fourth indication information may be identification information identifying an MME. Here, the identification information identifying an MME may be information identifying an MME included in the core network (type 2) 92. In addition, the identification information identifying an MME may be a GUMMEI identifying the MME_B 42. Moreover, the identification information identifying an MME may be an MMEGI identifying a group of MMEs included in the core network (type 2) 92.

Alternatively, the fourth indication information may be information obtained by combining two or more of: the information triggering a request or an instruction for switching core networks; the core network type; the identification information indicating that the core network needs to be switched; and the identification information identifying an MME, each of which has been described above. In addition, the second indication information obtained by combining two or more pieces of information as described above may be used as the core network type, the information indicating that a core network type is to be switched, or the identification information identifying an MME.

The eNB 45 receives the tracking update request message from the UE 10. The eNB 45 may perform the MME selecting process upon reception of the tracking area request message (S714).

In the MME selecting process, the eNB 45 selects the MME_B 42 on the basis of the MME-information updating process.

Alternatively, the eNB 45 may select the MME_B 42 based on the fourth indication information. As described above, when the fourth indication information has not been received, the eNB 45 may select the MME_A 40.

Alternatively, the eNB 45 may select the MME_B 42 on the basis of the MME-information updating process and reception of the fourth indication information. As described above, even when the MME selection on the basis of the MME-information updating process results in MME_B 42, the eNB 45 may select the MME_A 40 when the fourth indication information has not been received. In addition, even the fourth indication information has already been received, the eNB 45 may select the MME_A 40 when having not performed the MME-information updating process.

As described above, the eNB 45 can select either the MME_A 40 included in the core network (type 1) 90 or the MME_B 42 included in the core network (type 2) 92 based on one or both of the second indication information and the fourth indication information.

Note that the eNB 45 may select an MME included in the core network (type 2) 92 when a timer is in operation, and may select an MME included in the core network (type 1) based on information transmitted by the UE 10 when the timer is not in operation or a core network does not need to be switched.

As for the selection method in such a case, selection may be made based on information transmitted by the UE 10. For example, the UE 10 transmits the tracking area update request message with information identifying an MME such as a GUMMEI included in the tracking area update request message. When the received MME is available, the eNB may select the MME. Here, the eNB 45 may decide whether the MME is available on the basis of whether the MME has connectivity. In the present embodiment, the information transmitted by the UE 10 may be information identifying the MME_A 40 that has performed location management of the UE 10.

When the MME received from the UE 10 is not available, the UE 10 may transmit the tracking area update request message with identification information identifying a group of MMEs such as an MMEI, identification information identifying the UE 10 such as P-TMSI, location information such as tracking area ID (TAI) and tracking area code (TAC), or any information obtained by combining two or more pieces of the information described above included in the tracking area update request message. The eNB 45 may receive these pieces of information, and select an MME based on these pieces of information.

Thus, the eNB 45 completes the MME selecting process.

Note that the eNB 45 may decide whether to perform the MME selecting process, on the basis of a timer initiated in unison with the MME-information updating process. For example, when the timer is counting, the MME selecting process may be performed, and after the timer already ends or when the timer is not counting, the MME selecting process does not have to be performed.

More specifically, the eNB 45 may select the MME_B 42 when the timer is in operation, and may select the MME_A 40 when the timer is not in operation. Note that, when the timer is not in operation, the eNB 45 may select an MME based on the identification information identifying an MME included in the tracking area update request message. For example, the eNB 45 may select an MME identified by the tracking area update request message, or may select an MME based on the MMEGI included in the tracking area update request message, or may select a default MME. Note that, in this case, the eNB 45 may select the MME_A 40.

Note that the eNB 45 may stop the timer upon receiving the tracking area update request message transmitted by the UE 10.

Furthermore, when a terminal device that has not performed the MME-information updating process transmits the tracking area update request message, the eNB 45 may select an MME based on the identification information identifying an MME included in the tracking area update request message. For example, the eNB 45 may select an MME identified by the GUMMEI included in the tracking area update request message, or may select an MME based on the MMEGI included in the tracking area update request message, or may select a default MME. Note that, in this case, the eNB 45 may select the MME_A 40.

When the eNB 45 has selected the MME_B 42, the eNB 45 transmits the tracking area request message to the MME_B 42 (S716). Note that the tracking area update procedure after transmission of the tracking area request message may involve the transmitting and/or receiving of control messages and processes similar to those used in conventional tracking update procedure. Thus, a detailed description thereof will be omitted.

Furthermore, when the eNB 45 has selected the MME_A 40, the eNB 45 may transmit the tracking area update request message to the MME_A 40. In addition, the eNB 45 may receive a route reconfiguration request from the MME_A 40. Moreover, the eNB 45 may select the MME_B 42 based on the route reconfiguration request, and transmit the tracking area update request message to the MME_B 42. Note that the attach procedure after transmission of the tracking update request message may involve transmitting and/or receiving of control messages and processes similar to those use in conventional tracking update request messages. Thus, a detailed description thereof will be omitted.

As descried above, when the eNB 45 has selected the MME_B 42 through the MME selecting process, it is possible, for example, to transmit the tracking update request message without receiving a reroute reconfiguration request, and hence, transmitting and/or receiving of the control messages or other processes can be reduced.

Once completing the tracking area update procedure, the UE 10 can communicate using the PDN connection.

Note that that the core network (type 1) 90 and the core network (type 2) 92 are connected to the PDN_A 100 and PDN_B 102, respectively, according to the present procedure. However, as illustrated in FIG. 6, the PDN_A 100 and the PDN_B 102 may be the same network (PDN 100). In this case, the PGW_A 30 and the PGW_B 32 may be the same device (PGW_A 30).

In the present procedure, the UE 10 changes an MME that performs movement control from the MME_A 40 into the MME_B 42, without the reestablishment of a PDN connection. The UE 10 can continue communication using the PDN connection established with the PGW_A 30.

1. 3. 3 Third Procedure Example

Next, a third procedure example for changing a core network to which the UE 10 is connected will be described. The initial state in the procedure may be the same as the initial state described in the first procedure example.

In the initial state, the UE 10 has a connection to the core network (type 1) 90. More specifically, the UE 10 has a connection to the eNB 45. In addition, the UE 10 has a connection to the MME_A 40 via the eNB 45. Moreover, the UE 10 has a PDN connection established with the PGW_A 30. Here, the PDN connection refers to a communication path for delivering user data.

Note that the core network (type 1) 90 and the core network (type 2) 92 may both have different PGWs deployed therein. For example, the core network (type 1) 90 may be configured to include the PGW_A 30, and the core network (type 2) 92 may be configured to include the PGW_B 32.

Furthermore, the core network (type 1) 90 and the core network (type 2) 92 may have mutually different SGWs deployed therein. For example, the core network (type 1) 90 may be configured to include the SGW_A 35, and the core network (type 2) 92 may be configured to include the SGW_B 37.

The third procedure example will be described based on the assumption that the UE 10 has a PDN connection established with the PGW_A 30 in the initial state. In addition, the PDN connection between the UE 10 and the PGW_A 30 is established via the SGW_A 35.

Note that, in the third procedure example, the identification information identifying the UE 10 may be a globally unique temporary identity (GUTI) assigned globally and uniquely to the UE 10. Alternatively, the identification information may be subscriber information such as an international mobile subscriber identity (IMGI). Alternatively, the identification information may be identification information such as a packet temporary mobile subscriber identity (P-TMSI). Alternatively, two or more pieces of the identification information may be combined to be the identification information identifying the UE 10.

Furthermore, in the third procedure example, the identification information identifying an MME may be a globally unique MME identifier (GUMMEI) that corresponds to each MME. Note that the GUMMEI is globally unique identification information including information such as a PLMN, an MME group, and an MME code. Alternatively, the identification information identifying an MME may be an MME group identifier (MMEGI) identifying an MME group.

Note that the eNB 45 retains in advance an MMEGI and a GUMMEI that belongs to an MME group identified by the MMEGI with the MMEGI and the GUMMEI associated with each other. Thus, upon receiving an MMEGI, the eNB 45 can select a GUMMEI that belongs to the received MMEGI based on the MMEGI.

For example, the eNB 45 may store in advance, in the MME information, an MMEGI corresponding to a group of MMEs that belong to the core network (type 2) and GUM-MEIs corresponding to MMEs, such as the MME_B 42, that belong to the group of MMEGI with the MMEGI and the GUMMEI associated with each other.

Figure 8:
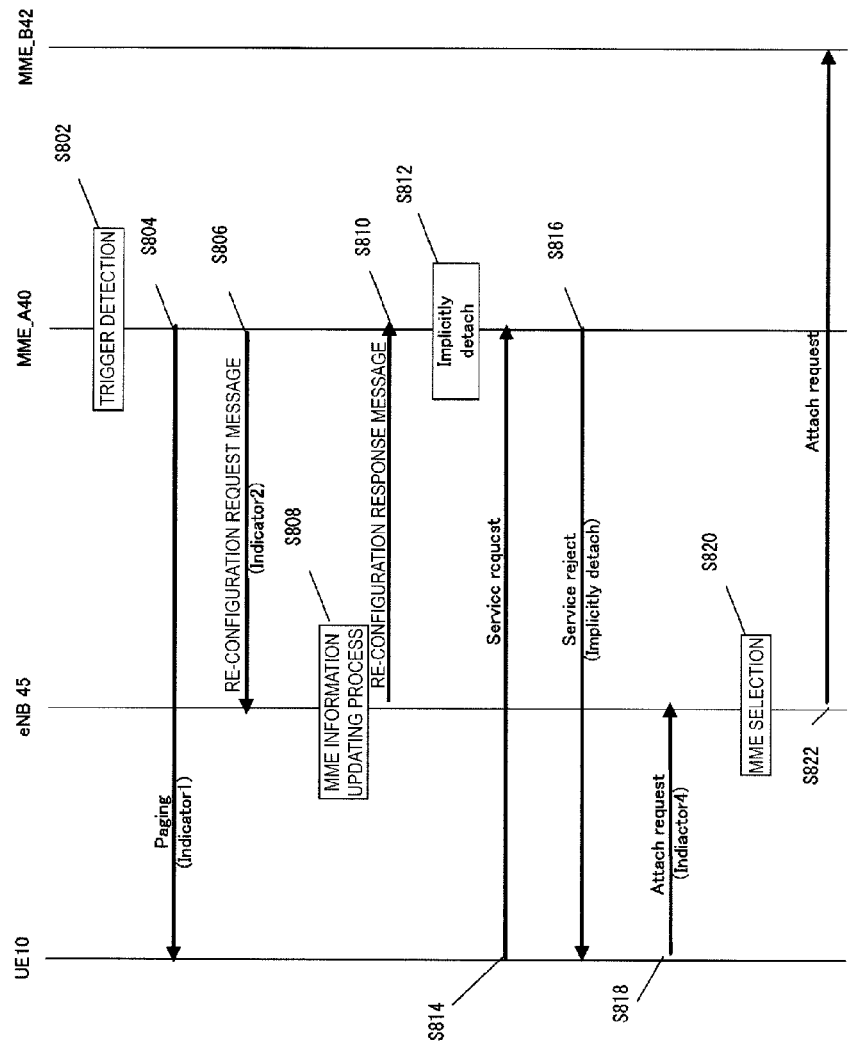
FIG. 8 is a diagram illustrating a third procedure according to the embodiment.

Specific steps of the third procedure example will be described below with reference to FIG. 8.

First, the MME_A 40 detects a trigger for starting the procedure of changing a core network to which the UE 10 is connected (S802).

Note that the trigger detection process may be the same as the trigger detection process (S502) described in the first procedure example. The trigger detection process will be described below.

The MME_A 40 may detect the trigger in response to an update of the subscriber information. More specifically, upon a change in subscriber information stored in the HSS 50 that also corresponds to the UE 10, the HSS 50 transmits, to the MME_A 40, a control message including identification information indicating that the change has been made. The MME_A 40 may detect that the core network to which the UE 10 is connected needs to be changed, upon reception of the control message transmitted by the HSS 50 or based on the identification information included in the control message.

Furthermore, the identification information included in the control message may be information on a core network indicating the core network type 2, or may be information such as a flag indicating a request to change a core network type. In addition, the control message may be a request to switch a core network. Moreover, the control message may include identification information identifying the UE 10.

The eNB 45 may receive an MMEGI corresponding to a group of MMEs that belong to the core network (type 2), and perform an MME selecting process. Note that the eNB 45 may select the MME_B 42 based on the received MMEGI.

The MME_A 40 may detect a trigger in response to an event that the core network (type 2) 92 has been configured. More specifically, the procedure may be triggered by installation of a control device, such as the MMEB 42 or the PGW_B 32, included in the core network (type 2) 92. Note that the operator of the core network may install such a control device, and manually operate the MME_A 40 after the installation. The MME_A 40 may detect a trigger in response to such a manual operation by the operator.

Next, the MME_A 40 transmits a paging message to the UE 10 upon the detection of the trigger (S804).

Here, the MME_A 40 may transmit the paging message with at least first indication information (Indicator 1) included in the paging message.

Note that the first indication information may be information triggering a request or an instruction for switching core networks.

Alternatively, the first indication information may be a core network type. Note that the core network type may be information identifying the core network (type 2). Specifically, the core network type may be network resource identifiers (NRIs) identifying the core network (type 2) 92.

Alternatively, the first indication information may be information indicating that a core network type will be switched. More specifically, the information indicating that the core network type will be switched may be a cause value indicating that a core network needs to be switched.

Alternatively, the first indication information may be information indicating that the UE 10 needs to be reattached. More specifically, the information indicating that the UE 10 needs to be re-attached may be a cause value indicating Attach Required.

Alternatively, the first indication information may be identification information identifying an MME. Here, the identification information identifying an MME may be information identifying an MME included in the core network (type 2) 92. In addition, the identification information identifying an MME may be a GUMMEI identifying the MME_B 42. Moreover, the identification information identifying an MME may be an MMEGI identifying a group of MMEs included in the core network (type 2) 92.

Alternatively, the first indication information may be information obtained by combining two or more of: the information triggering a request or an instruction for switching core networks; the core network type; the information indicating that a core network type will be switched; the information indicating that re-attach is necessary; and the identification information identifying an MME, each of which has been described above. In addition, the first indication information obtained by combining two or more pieces of information as described above may be used as the core network type, the information indicating that a core network type will be switched, the information indicating that re-attach is necessary, or the identification information identifying an MME.

Furthermore, the MME_A 40 may transmit a route reconfiguration request message to the eNB 45, in parallel with transmission of the paging message or after transmission of the paging message (S806). The MME_A may transmit the route reconfiguration request message to request an update of information on an MME.

Here, the MME_A 40 may transmit the route reconfiguration request message with at least second indication information (Indicator 2) included in the route reconfiguration request message.

The second indication information may be information triggering a request or an instruction for switching core networks.

Alternatively, the second indication information may be a core network type. Note that the core network type may be information identifying the core network (type 2). Specifically, the core network type may be network resource identifiers (NRIs) identifying the core network (type 2) 92.

Alternatively, the second indication information may be information indicating that a core network type will be switched. More specifically, the information indicating that the core network type will be switched may be a cause value indicating that a core network needs to be switched.

Alternatively, the second indication information may be information indicating that the UE 10 needs to be re-attached. More specifically, the information indicating that the UE 10 needs to be re-attached may be a cause value indicating Attach Required.

Alternatively, the second indication information may be identification information identifying an MME. Here, the identification information identifying an MME may be information identifying an MME included in the core network (type 2) 92. In addition, the identification information identifying an MME may be a GUMMEI identifying the MME_B 42. Moreover, the identification information identifying an MME may be an MMEGI identifying a group of MMEs included in the core network (type 2) 92.

Alternatively, the second indication information may be information obtained by combining two or more of: the information giving a request or an instruction for switching core networks; the core network type; the information indicating that a core network type will be switched; the information indicating that re-attach is necessary; and the identification information identifying an MME, each of which has been described above. In addition, the second indication information obtained by combining two or more pieces of information as described above may be used as the core network type, the information indicating that a core network type is to be switched, the information indicating that re-attach is necessary, or the identification information identifying an MME.

The MME_A 40 may transmit a transmission UE context release message with at least the identification information identifying the UE 10 and a timer value included in the transmission UE context release message. Note that the timer value may be a value of a timer used by the eNB 45 to select an MME.

Note that the route reconfiguration request message may be a control message for giving a request or an instruction for updating information on an MME, and may be any control message. Therefore, the MME_A 40 may request or instruct the eNB 45 to update information on an MME with another control message. In this case, the description of the route reconfiguration request message in the present embodiment can be applied to the control message used for giving a request or an instruction for updating information on an MME. Next, the eNB 45 receives the route reconfiguration request message from the MME_A 40. The eNB 45 may perform an MME-information updating process based on the information included in the route reconfiguration request message (S808). More specifically, the eNB 45 may perform the MME-information updating process based on the second indication information.

Note that the MME-information updating process may be a process in which MME information is updated in a manner such that the eNB 45 selects an MME included in the core network (type 2) 92, at the time as MME selection, which is performed upon reception of an attach request message transmitted by the UE 10.

More specifically, in the MME-information updating process, the eNB 45 may store the identification information identifying the UE 10 and the second indication information in association with each other.

Furthermore, when the second indication information has been acquired, the eNB 45 may retain the UE context information without deleting the UE context information. On the other hand, when having not acquired the second indication information, the eNB 45 may delete the UE context information.

Furthermore, the eNB 45 may start a timer to measure time based on the reception of the second indication information. While the timer is in operation, the eNB 45 may retain the updated MME information or the UE context. In addition, when the timer expires or the timer stops for some reason, the eNB 45 may delete the updated MME information or the UE context.

Here, a value retained in advance by the eNB 45 may be used as the value of a timer, or a timer value included in the UE context release message may be used.

Note that the eNB 45 may still retain information on an MME that the eNB 45 has already retained before the MME-information updating process is performed. For example, the eNB 45 may still retain the GUMMEI corresponding to the MME_A 40 included in the core network (type 1) 90, the MMEGI indicating a group of MMEs to which the MME_A 40 belongs, and the like.

The MME-information updating process is completed through the above-described steps. Furthermore, the eNB 45 may transmit the route reconfiguration response message to the MME_A 40 as a response to the route reconfiguration request message, on the basis of completion of the MME-information updating process (S810). The eNB 45 may transmit the route reconfiguration response message to notify completion of the MME-information updating process.

Furthermore, the eNB 45 may perform the MME-information updating process upon acquisition of the second indication information, and when the eNB 45 retains the MME information or the like through the MME-information updating process, the eNB 45 may transmit the route reconfiguration response message with information indicating that the UE context or the MME information on the core network (type 2) 92 is included in the route reconfiguration response message.

Note that the route reconfiguration response message may be any response to a control message for triggering a request or an instruction for updating information on an MME, and may also be any control message. Therefore, the MME_A 40 may transmit to the MME_A 40, the response with another control message. In this case, the description for the route reconfiguration response message in the present embodiment can be applied to the control message used for the response.

The MME_A 40 may receive the route reconfiguration response message, and perform a detach process (Implicitly detach) without starting a control procedure on the basis of MME_A 40 initiation (S812). Note that, in the detach process, the UE context retained by the MME_A 40 may be deleted.

Furthermore, upon receiving the paging message, the UE 10 may start a service request procedure. Note that the UE 10 may start the service request procedure based on the first indication information.

Specifically, the UE 10 may transmit a service request message to the MME_A 40 (S814). The UE 10 may transmit the service request message to request the initiation of a service or allocation of a radio resource between the UE 10 and the eNB 45.

Upon receiving the service request message, the MME_A 40 may transmit a service rejection message as a response to the service request message (S816).

The transmission of the service rejection message may be made on the basis of the completion of the detach process in the MME_A 40.

Here, the MME_A 40 may transmit the service reject message with at least information indicating that the detach process is completed included in the service reject message. More specifically, the information indicating that the detach process is completed may be a cause value indicating Implicitly Detach.

Note that the first indication information included in the service reject message instead of the paging message may be transmitted to the UE 10.

The UE 10 receives the service reject message. The UE 10 may start the attach procedure upon the reception of the service rejection or based on information indicating that the detach process has been completed. Alternatively, upon receiving the service rejection message, the UE 10 may start the attach procedure on the basis of the acquisition of the first indication information.

Furthermore, the UE 10 may delete the information retained in an MME, upon receiving the first indication information. The information in an MME to be deleted may be a GUMMEI for the MME_A 40. Alternatively, the information in an MME to be deleted may be an MMEGI indicating a group to which the MME_A 40 belongs. As described above, the first indication information may be used as information indicating that the old information on the MME has been deleted. The information retained in an MME may be deleted after the reception of the service reject message.

Next, the attach procedure will be described. The UE 10 transmits an attach request message to the eNB 45 to start the attach procedure (S818). The UE 10 transmits the attach request message to request a connection to a core network again. Note that the UE 10 may transmit the attach request message with the identification information identifying the UE included in the attach request message.

Here, the UE 10 may transmit the attach request message with at least fourth indication information (Indicator 4) included in the attach request message. Note that the UE 10 may decide to include the fourth indication information on the basis of the reception of one or both of the first indication information and the third indication information.

The fourth indication information may be information triggering a request or an instruction for switching core networks.

The fourth indication information may be a core network type. Note that the core network type may be information identifying the core network (type 2). Specifically, the core network type may be network resource identifiers (NRIs) identifying the core network (type 2) 92.

Alternatively, the fourth indication information may be identification information indicating that a core network needs to be switched. Specifically, the identification information indicating that a core network needs to be switched may be a core network type identifying the core network (type 2) 92. The identification information may be network resource identifiers (NRIs) identifying the core network (type 2) 92. Alternatively, the identification information may be information that does not indicate a specific MMEGI or NRI by using MMEGI or NRI that has zero or another specific value, such as NULL-MMEGI or NULL-NRI.

Alternatively, the fourth indication information may be identification information identifying an MME. Here, the identification information identifying an MME may be information identifying an MME included in the core network (type 2) 92. In addition, the identification information identifying an MME may be a GUMMEI identifying the MME_B 42. Moreover, the identification information identifying an MME may be an MME GI identifying a group of MMEs included in the core network (type 2) 92.

Alternatively, the fourth indication information may be information obtained by combining two or more of: the information triggering a request or an instruction for switching core networks; the core network type; the identification information indicating that the core network needs to be switched; and the identification information identifying an MME, each of which has been described above. In addition, the second indication information obtained by combining two or more pieces of information as described above may be used as the core network type, the information indicating that a core network type will be switched, the information indicating that re-attach is necessary, or the identification information identifying an MME.

Furthermore, the UE 10 does not necessarily have to transmit the fourth indication information with the fourth indication information included in the attach request message. The UE 10 may transmit the fourth indication information with the fourth indication information included in the control message to be transmitted by the UE 10 in the attach procedure.

The eNB 45 receives the attach request message from the UE 10. The eNB 45 performs the MME selecting process upon reception of the attach request message (S820).

In the MME selecting process, the eNB 45 selects the MME_B 42 on the basis of the MME-information updating process.

Alternatively, the eNB 45 may select the MME_B 42 based on the fourth indication information. As described above, when the fourth indication information has not been received, the eNB 45 may select the MME_A 40.

Alternatively, the eNB 45 may select the MME_B 42 on the basis of the MME-information updating process and reception of the fourth indication information. As described above, even when the MME selection on the basis of the MME-information updating process results in MME_B 42, the eNB 45 may select the MME_A 40 when the fourth indication information has not been received. In addition, even when the fourth indication information has been received, the eNB 45 may select the MME_A 40 when the MME-information updating process has not been performed.

As described above, the eNB 45 can select either the MME_A 40 included in the core network (type 1) 90 or the MME_B 42 included in the core network (type 2) 92 based on one or both of the second indication information and the fourth indication information.

Note that the eNB 45 may select an MME included in the core network (type 2) 92 when the timer is in operation, and may select an MME included in the core network (type 1) based on information transmitted by the UE 10 when the timer is not in operation or a core network does not have to be switched.

As for the selection method in such a case, selection may be made based on information transmitted by the UE 10. For example, the UE 10 transmits the attach request message with information identifying an MME such as a GUMMEI included in the attach request message. When the received MME is available, the eNB may select the MME. Here, the eNB 45 may decide whether the MME is available on the basis of whether the MME has connectivity. In the present embodiment, the information transmitted by the UE 10 may be information identifying the MME_A 40 that has performed location management of the UE 10.

When the MME received from the UE 10 is not available, the UE 10 may transmit the attach request message with identification information identifying a group of MMEs such as an MMEI, identification information identifying the UE 10 such as P-TMSI, location information such as tracking area ID (TAI) and tracking area code (TAC), or any information obtained by combining two or more pieces of the information described above that are included in the attach request message. The eNB 45 may receive these pieces of information, and select an MME based on these pieces of information.

Thus, the eNB 45 completes the MME selecting process.

Note that the eNB 45 may decide whether to perform the MME selecting process on the basis of a timer initiated in unison with the MME-information updating process. For example, when the timer is counting, the MME selecting process may be performed, and after the timer already ends or when the timer is not counting, the MME selecting process does not have to be performed.

More specifically, the eNB 45 may select the MME_B 42 when the timer is in operation, and may select the MME_A 40 when the timer is not in operation. Note that when the timer is not in operation, the eNB 45 may select an MME based on the identification information identifying an MME included in the attach request. For example, the eNB 45 may select an MME identified by the GUMMEI included in the attach request message, or may select an MME based on the MMEGI included in the attach request message, or may select a default MME. Note that in this case, the eNB 45 may select the MME_A 40.

Note that the eNB 45 may stop the timer upon receiving the attach request message transmitted by the UE 10.

Furthermore, when a terminal device that has not performed the MME-information updating process transmits the attach request message, the eNB 45 may select an MME based on the identification information identifying an MME included in the attach request. For example, the eNB 45 may select an MME identified by the GUMMEI included in the attach request message, the MMEGI included in the attach request message, or the MMEGI included in the attach request message, or may select a default MME. Note that, in this case, the eNB 45 may select the MME_A 40.

When the eNB 45 has selected the MME_B 42, the eNB 45 transmits the attach request message to the MME_B 42 (S822). Note that the attach procedure after transmission of the attach request message may involve transmitting and/or receiving of control messages and processes similar to those used in conventional attach procedures. Thus, a detailed description thereof will be omitted.

Furthermore, when the eNB 45 has selected the MME_A 40, the eNB 45 may transmit the attach request message to the MME_A 40. In addition, the eNB 45 may receive a route reconfiguration request from the MME_A 40. Moreover, the eNB 45 may select the MME_B 42 in accordance with the route reconfiguration request, and transmit the attach request message to the MME_B 42. Note that the attach procedure after transmission of the attach request message may involve transmitting and/or receiving of control messages and processes similar to those used in conventional attach procedures. Thus, a detailed description thereof will be omitted.

As described above, when the eNB 45 has selected the MME_B 42 through the MME selecting process, it is possible, for example, to perform the attach procedure without receiving a reroute reconfiguration request, and hence, transmitting and/or receiving of the control messages or other processes can be reduced.

Note that the MME_B 42 receives the attach request message from the eNB 45, and selects an SGW and a PGW. Here, the MME_B 42 may select the SGW_B 37 and the PGW_B 32 for the core network (type 2) 92, and establish a PDN connection between the UE 10 and the PGW_B 32.

Through the attach procedure, the UE 10 establishes a PDN connection with the PGW_B 32. In addition, the PDN connection between the UE 10 and the PGW_B 32 is established via the SGW_B 37. Moreover, with the established PDN connection, the UE 10 can transmit/receive user data to/from a communication device included in the PDN_B 102.

Note that the core network (type 1) 90 and the core network (type 2) 92 are connected to the PDN_A 100 and PDN_B 102, respectively, in the present procedure. However, as illustrated in FIG. 6, the PDN_A 100 and the PDN_B 102 may be the same network (PDN 100). In this case, the PGW_A 30 and the PGW_B 32 may be the same device (PGW_A 30).

In other words, with the present procedure, the UE 10 changes an MME that performs movement control from the MME_A 40 to the MME_B 42. In addition, a new PDN connection may be established without changing a PGW serving as an end point of a PDN connection. Moreover, in the attach procedure described in the present procedure, the MME_B 42 may select the PGW_A 30 that serves as an end point of a PDN connection that the UE 10 established in the past. With this selection, the UE 10 may establish a PDN connection with the PGW_A 30.

1. 3. 4 Fourth Procedure Example

Next, a fourth procedure example for changing a core network to which the UE 10 is connected will be described. The initial state of the procedure may be the same as the initial state described in the first procedure example.

In the initial state, the UE 10 has a connection established with the core network (type 1) 90. More specifically, the UE 10 has a connection established with the eNB 45. In addition, the UE 10 has a connection established with the MME_A 40 via the eNB 45. Moreover, the UE 10 has a PDN connection established with the PGW_A 30. Here, the PDN connection refers to a communication path for delivering user data.

Note that the core network (type 1) 90 and the core network (type 2) 92 may both have different PGWs deployed therein. For example, the core network (type 1) 90 may be configured to include the PGW_A 30, and the core network (type 2) 92 may be configured to include the PGW_B 32.

Furthermore, the core network (type 1) 90 and the core network (type 2) 92 may both have different SGWs deployed therein. For example, the core network (type 1) 90 may be configured to include the SGW_A 35, and the core network (type 2) 92 may be configured to include the SGW_B 37.

The fourth procedure example will be described on the assumption that the UE 10 has a PDN connection established with the PGW_A 30 in the initial state. In addition, the PDN connection between the UE 10 and the PGW_A 30 is established via the SGW_A 35.

Note that, in the fourth procedure example, the identification information identifying the UE 10 may be a globally unique temporary identity (GUTI) assigned globally and uniquely to the UE 10. Alternatively, the identification information may be subscriber information such as an international mobile subscriber identity (IMGI). Alternatively, the identification information may be identification information such as a packet temporary mobile subscriber identity (P-TMSI). Alternatively, two or more pieces of the identification information may be combined to be the identification information identifying the UE 10.

Furthermore, in the fourth procedure example, the identification information identifying an MME may be a globally unique MME identifier (GUMMEI) that corresponds to each MME. Note that the GUMMEI is globally unique identification information including information such as a PLMN, an MME group, and an MME code. Alternatively, the identification information identifying an MME may be an MME group identifier (MMEGI) identifying an MME group.

Note that the eNB 45 retains in advance an MMEGI and a GUMMEI that belongs to an MME group identified by the MMEGI with the MMEGI and the GUMMEI associated with each other. Thus, upon receiving an MMEGI, the eNB 45 can select a GUMMEI that belongs to the received MMEGI in based on the MMEGI.

For example, the eNB 45 may store in advance, in the MME information, an MMEGI corresponding to a group of MMEs that belong to the core network (type 2) and GUMMEIs corresponding to MMEs, such as the MME_B 42, that belong to the group of MMEs with the MMEGI and the GUMMEI associated with each other.

Figure 9:
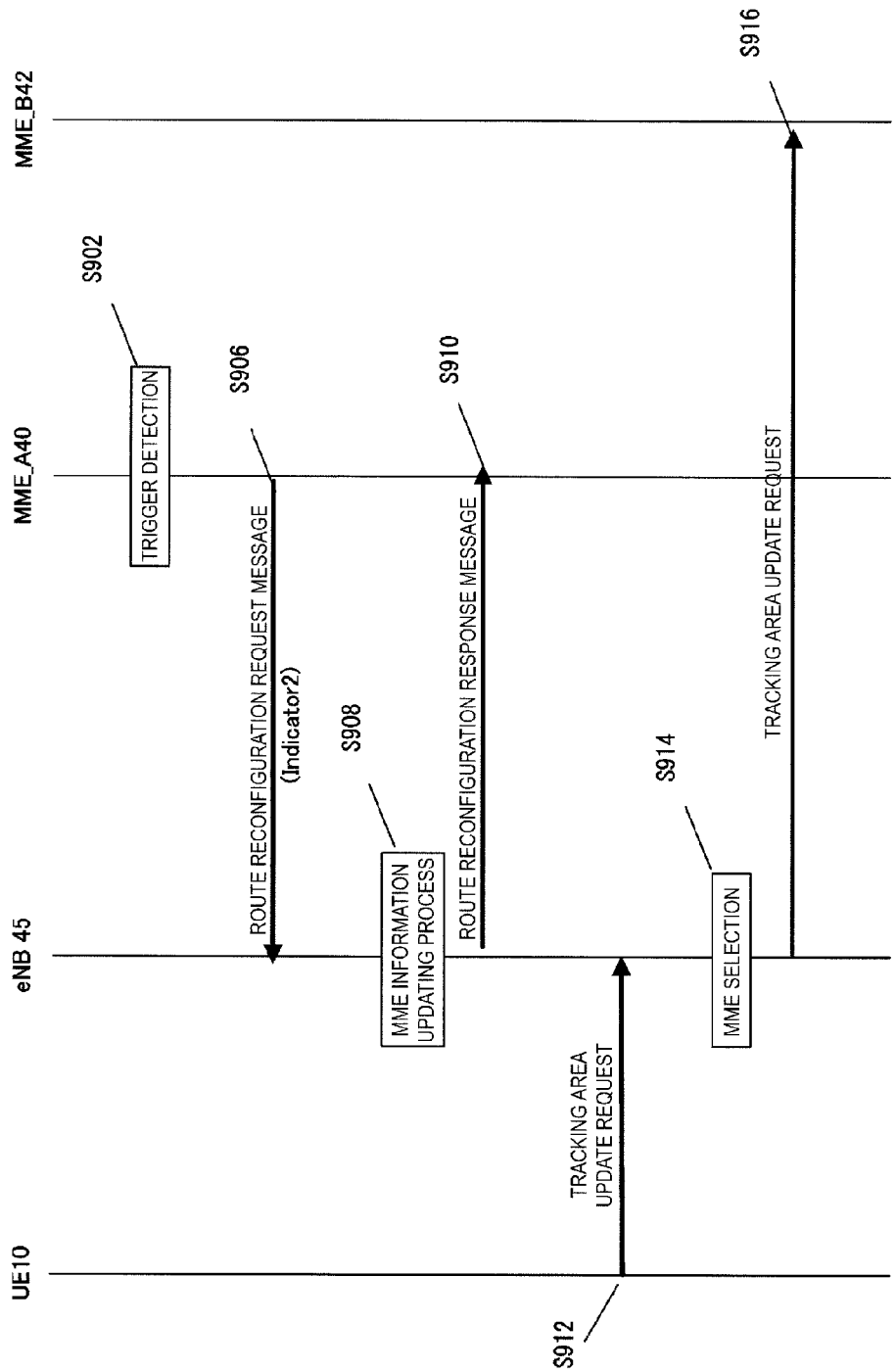
FIG. 9 is a diagram illustrating a fourth procedure according to the embodiment.

Specific steps of the fourth procedure example will be described below with reference to FIG. 9.

First, the MME_A 40 detects a trigger for starting a procedure of changing a core network to which the UE 10 is connected (S902).

Note that the trigger detecting process may be the same as the trigger detecting process (S502) described in the first procedure example. The trigger detecting process will be described below.

The MME_A 40 may detect the trigger on the basis of the updating of the subscriber information. More specifically, on the basis of a change in subscriber information corresponding to the UE 10 that is stored in the HSS 50. The HSS 50 transmits, to the MME_A 40, a control message including identification information indicating that the change has been made. The MME_A 40 may detect that the core network to which the UE 10 is connected needs to be changed, upon receiving the control message transmitted by the HSS 50 or based on the identification information included in the control message.

Furthermore, the identification information may be information on a core network indicating the core network type 2, or information such as a flag indicating a request to change a core network type. In addition, the control message may be a control message for requesting the switching of a core network. Moreover, the control message may include identification information identifying the UE 10.

The eNB 45 may receive an MMEGI corresponding to a group of MMEs that belong to the core network (type 2), and perform an MME selecting process. Note that the eNB 45 may select the MME_B 42 based on the received MMEGI.

The MME_A 40 may detect a trigger on the basis of an event that the core network (type 2) 92 has been configured. More specifically, the procedure may be triggered by installation of a control device, such as the MME_B 42 or the PGW_B 32, included in the core network (type 2) 92. Note that the operator of the core network may install such a control device, and manually operate the MME_A 40 after the installation. The MME_A 40 may detect a trigger on the basis of such manual operation by the operator.

Next, the MME_A 40 may transmit a route reconfiguration request message to the eNB 45 upon the detection of the trigger. The MME_A may transmit the route reconfiguration request message to request an update of information on an MME (S906). The MME_A may transmit the route reconfiguration request message to request an update of information on an MME.

Here, the MME_A 40 may transmit the route reconfiguration request message with at least second indication information (Indicator 2) included in the route reconfiguration request message.

The second indication information may be information giving a request or an instruction for switching core networks.

Alternatively, the second indication information may be a core network type. Note that the core network type may be information identifying the core network (type 2). Specifically, the core network type may be network resource identifiers (NRIs) identifying the core network (type 2) 92.

Alternatively, the second indication information may be information indicating that a core network type will be switched. More specifically, the information indicating that the core network type will be switched may be a cause value indicating that a core network needs to be switched.

Alternatively, the second indication information may be information indicating that the UE 10 needs to be re-attached. More specifically, the information indicating that the UE 10 needs to be re-attached may be a cause value indicating Attach Required.

Alternatively, the second indication information may be identification information identifying an MME. Here, the identification information identifying an MME may be information identifying an MME included in the core network (type 2) 92. In addition, the identification information identifying an MME may be a GUMMEI identifying the MME_B 42. Moreover, the identification information identifying an MME may be an MMEGI identifying a group of MMEs included in the core network (type 2) 92.

Alternatively, the second indication information may be information obtained by combining two or more of: the information giving a request or an instruction for switching core networks; the core network type; the information indicating that a core network type is to be switched; the information indicating that re-attach is necessary; and the identification information identifying an MME, each of which has been described above. In addition, the second indication information obtained by combining two or more pieces of information as described above may be used as the core network type, the information indicating that a core network type is to be switched, the information indicating that re-attach is necessary, or the identification information identifying an MME.

The MME_A 40 may transmit a UE context release message with at least the identification information identifying the UE 10 and a timer value included in the transmission UE context release message. Note that the timer value may be the value of a timer used by the eNB 45 to select an MME.

The timer value may be configured to be a value equal to or greater than the time it takes for the UE 10 to perform the tracking area update procedure. Alternatively, the timer value may be configured to a value equal to or greater than a time interval up to when the UE 10 performs the next tracking area update procedure. Alternatively, the timer value may be configured to be a value equal to or greater than the remaining time of the tracking area update timer of the UE 10. Note that the tracking area update timer is a timer initiated to count by the UE 10 and the MME_A 40 upon execution of the tracking area update procedure, and the UE 10 starts the tracking area update procedure upon expiration of the timer. Therefore, the remaining time of the tracking area update timer corresponds to the time up to when the next tracking area update procedure is started.

Next, the eNB 45 receives the route reconfiguration request message from the MME_A 40. The eNB 45 may perform an MME-information updating process based on the information included in the route reconfiguration request message (S908). More specifically, the eNB 45 may perform the MME-information updating process based on the second indication information.

Note that the MME-information updating process may be a process in which MME information is updated in a manner such that the eNB 45 selects an MME included in the core network (type 2) 92, at the time of MME selection, which is performed upon reception of a tracking area request message transmitted by the UE 10.

More specifically, in the MME-information updating process, the eNB 45 may store the identification information identifying the UE 10 and the second indication information in association with each other.

Furthermore, when the second indication information has been acquired, the eNB 45 may retain the UE context information without deleting the UE context information. On the other hand, when the second indication information has not been acquired, the eNB 45 may delete the UE context information.

Furthermore, the eNB 45 may start the timer based on reception of the second indication information. While the timer is in operation, the eNB 45 may retain the updated MME information or the UE context. In addition, when the timer expires or the timer stops for some reason reason, the eNB 45 may delete the updated MME information or the UE context.

Here, a value retained in advance by the eNB 45 may be used as the value for the timer, or a timer value included in the UE context release message may be used.

Note that the timer value may be configured to a timer value equal to or greater than the duration of the tracking area update procedure performed by the UE 10. Alternatively, the timer value may be configured to be a value equal to or greater than the remaining time of the tracking area update timer of the UE 10.

Note that the eNB 45 may still retain information on an MME that the eNB 45 has already retained before the MME-information updating process is performed. For example, the eNB 45 may still retain the GUMMEI corresponding to the MME_A 40 included in the core network (type 1) 90, the MMEGI indicating a group of MMEs to which the MME_A 40 belongs, and the like.

The MME-information updating process is completed through the above-described steps. Furthermore, the eNB 45 may transmit the route reconfiguration response message to the MME_A 40 as a response to the route reconfiguration request message, on the basis of completion of the MME-information updating process (S910). The eNB 45 may transmit the route reconfiguration response message to notify the completion of the MME-information updating process.

Furthermore, the eNB 45 may perform the MME-information updating process upon acquisition of the second indication information, and when the eNB 45 retains the MME information or the like through the MME-information updating process, the eNB 45 may transmit the route reconfiguration response message with information indicating that the UE context or the MME information on the core network (type 2) 92 is included in the route reconfiguration response message.

The UE 10 may start the tracking area update procedure. Note that the UE 10 may start the tracking area update procedure upon expiration of the tracking area update timer, which counts the transmission duration of tracking area update requests.

Next, the tracking area update procedure will be described. The UE 10 transmits a tracking area update request message to the eNB 45 to start the tracking area update procedure (S912).

The eNB 45 receives the tracking update request message from the UE 10. The eNB 45 may perform the MME selecting process on the basis of reception of the tracking area request message (S914).

In the MME selecting process, the eNB 45 selects the MME_B 42 on the basis the MME-information updating process. In addition, the eNB 45 may select the MME_A 40 when having not performed the MME-information updating process.

As described above, the eNB 45 can select either the MME_A 40 included in the core network (type 1) 90 or the MME_B 42 included in the core network (type 2) 92 in accordance with the second indication information.

Note that the eNB 45 may select an MME included in the core network (type 2) 92 when the timer is in operation, and may select an MME included in the core network (type 1)

based on information transmitted by the UE 10 when the timer is not in operation or a core network does not have to be switched.

The eNB 45 may select an MME included in the core network (type 1) in accordance with information transmitted by the UE 10 when the timer is not in operation or when a core network does not have to be switched.

As for the selection method in such a case, selection may be made based on information transmitted by the UE 10. For example, the UE 10 transmits the tracking area update request message with information identifying an MME such as a GUMMEI included in the tracking area update request message. When the received MME is available, the eNB may select the received MME. Here, the eNB 45 may decide whether the MME is available on the basis of whether the MME has connectivity. In the present embodiment, the information transmitted by the UE 10 may be information identifying the MME_A 40 that has performed location management for the UE 10.

When the MME received from the UE 10 is not available, the UE 10 may transmit the tracking area update request message with identification information identifying a group of MMEs such as an MMEI, UE 10 such as P-TMSI, location information such as tracking area ID (TAI) and tracking area code (TAC), or any information obtained by combining two or more pieces of the information described above included in the tracking area update request message. The eNB 45 may receive these pieces of information, and select an MME based on these pieces of information.

Thus, the eNB 45 completes the MME selecting process.

Note that the eNB 45 may decide whether to perform the MME selection process, on the basis of a timer initiated in unison with the MME-information updating process. For example, the MME selecting process may be performed when the timer is counting, and does not have to be performed after the timer has stopped or when the timer is not counting.

More specifically, the eNB 45 may select the MME_B 42 when the timer is in operation, and may select the MME_A 40 when the timer is not in operation. Note that when the timer is not in operation, the eNB 45 may select an MME based on the identification information identifying an MME included in the tracking area update request message. For example, the eNB 45 may select an MME identified by the tracking area update request message, an MME based on the MMEGI included in the tracking area update request message, or it may select a default MME. Note that, in this case, the eNB 45 may select the MME_A 40.

Note that the eNB 45 may stop the timer upon receiving the tracking area update request message transmitted by the UE 10.

Furthermore, when a terminal device that has not performed the MME-information updating process transmits the tracking area update request message, the eNB 45 may select an MME based on the identification information identifying an MME included in the tracking area update request message. For example, the eNB 45 may select an MME identified by the GUMMEI included in the tracking area update request message, an MME based on the MMEGI included in the tracking area update request message, or it may select a default MME. Note that, in this case, the eNB 45 may select the MME_A 40.

When the eNB 45 has selected the MME_B 42, the eNB 45 transmits the tracking area request message to the MME_B 42 (S916). Note that the tracking area update procedure after transmission of the tracking area request message may involve the transmitting and/or receiving of control messages and processes similar to those used in conventional tracking update procedures. Thus, a detailed description thereof will be omitted.

Furthermore, when the eNB 45 has selected the MME_A 40, the eNB 45 may transmit the tracking area update request message to the MME_A 40. In addition, the eNB 45 may receive a route reconfiguration request from the MME_A 40. Moreover, the eNB 45 may select the MME_B 42 based on the route reconfiguration request, and transmit the tracking area update request message to the MME_B 42. Note that the attach procedure after transmission of the tracking update request message may involve the transmitting and/or receiving of control messages and processes similar to conventional tracking update request messages. Thus, a detailed description thereof will be omitted.

As described above, when the eNB 45 has selected the MME_B 42 through the MME selection process, it is possible, for example, to execute the tracking update request message without receiving a reroute reconfiguration request, and hence, transmitting and/or receiving of the control messages or other processes can be reduced.

Once completing the tracking area update procedure, the UE 10 can communicate using the PDN connection.

Note that the core network (type 1) 90 and the core network (type 2) 92 are connected to the PDN_A 100 and PDN_B 102, respectively, in the present procedure. However, as illustrated in FIG. 6, the PDN_A 100 and the PDN_B 102 may be the same network (PDN 100). In this case, the PGW_A 30 and the PGW_B 32 may be the same device (PGW_A 30).

In the present procedure, the UE 10 changes an MME that performs movement control from the MME_A 40 into the MME_B, but the PDN connection does not have to be reestablished. The UE 10 can continue communication using the PDN connection established with the PGW_A 30.

1. 3. 5. Procedure Selection Process

The first procedure example to the fourth procedure example have been described in detail above, as procedures for changing a core network. Note that the MME_A 40 may decide the appropriate procedures from the first procedure example to the fourth procedure example based on the conditions.

For example, the MME_A 40 may select a procedure based on on the state of an attached UE 10. More specifically, the MME_A 40 manages the state of an attached UE 10. For example, the state of the UE 10 may be managed based on whether the UE is in an idle state in which a radio resource has been released or in an active state in which a radio resource has been allocated and data transmission and reception is available.

Moreover, when changing a core network, the MME_A 40 may select a procedure on the basis of whether or not the PGW needs be changed. Note that the decision of whether or not the PGW will to be changed may be made in accordance with the policy of a network operator.

Furthermore, the decision may be based on both the state of the UE 10 and the necessity for change regarding the PGW. For example, the MME_A 40 may select the first procedure when the UE 10 is in the active state and the PGW needs be changed. More specifically, when the UE 10 is in an active state and the PGW needs be changed, the UE 10 may transmit a detach request message (S504) and subsequently perform the first procedure.

The MME_A 40 may select the second procedure when the UE 10 is in an active state and the PGW does not have to be changed. More specifically, when the UE 10 is in the active state and the PGW does not have to be changed, the UE 10 may transmit a UE context release message (S704) and subsequently perform the second procedure.

The MME_A 40 may select the third procedure when the UE 10 is in an idle state and the PGW does not have to be changed. More specifically, when the UE 10 is in an idle state and the PGW does not have to be changed, the UE 10 may transmit a paging message (S804) and subsequently perform the third procedure.

The MME_A 40 may select the fourth procedure when the UE 10 is in an idle state and the PGW does not have to be changed. More specifically, when the UE 10 is an idle state and the PGW does not have to be changed, the UE 10 may transmit a route reconfiguration request message (S904) and subsequently perform the fourth procedure.

Note that the MME_A 40 may select any of the procedures after detecting a trigger to start the corresponding procedure.

The procedures described above make it possible to change a core network to which the UE 10 is connected on the basis of MME_A 40 initiation.

2. Variations

An embodiment of the invention and variations thereof have been described in detail thus far with reference to the drawings, but the specific configuration is not limited to the embodiment. Other designs and the like that do not depart from the essential spirit of the invention also fall within the scope of the patent claims.

Additionally, the program run on the devices in the embodiments are programs that control a CPU (programs that cause a computer to function) so as to realize the functions of the above-described embodiments. The information handled by these devices is temporarily held in a transitory storage device (RAM, for example) at the time of processing, and is then stored in various storage devices such as a ROM and an HDD, read out by the CPU as necessary, and edited and written.

Here, a semiconductor medium (a ROM, a non-volatile memory card, or the like, for example), an optical recording medium/magneto-optical recording medium (a digital versatile disc (DVD), a magneto optical disc (MO), a mini disc (MD), a compact disc (CD), a BD, or the like, for example), a magnetic recording medium (magnetic tape, a flexible disk, or the like, for example), and the like can be given as examples of recording media for storing the programs. In addition to realizing the functions of the above-described embodiments by executing programs that have been loaded, there are also cases where the functions of the present invention are realized by the programs running cooperatively with an operating system, other application programs, or the like on the basis of instructions included in those programs.

When delivering these programs to market, the programs can be stored in a portable recording medium, or transferred to a server computer connected via a network such as the Internet. In this case, the storage device serving as the server computer is of course also included in the present invention.

Additionally, each device in the above-described embodiment may be partially or completely realized as a large scale integration (LSI) circuit, which is a typical integrated circuit. The functional blocks of each device may be individually realized as chips, or may be partially or completely integrated into a chip. The circuit integration technique is not limited to LSI, and the integrated circuits for the functional blocks may be realized as dedicated circuits or a general purpose processor. Furthermore, if advances in semiconductor technology produce circuit integration technology capable of replacing LSI, it is of course possible to use integrated circuits based on the technology.

Additionally, although the above-described embodiment mentions LTE and a WLAN (IEEE 802.11a/b/n, for example) as examples of the wireless access network, the connections may be made with WiMAX instead of a WLAN.

REFERENCE SIGNS LIST

1 Communication system
10 UE
30 PGW_A
32 PGW_B
35 SGW_A
37 SGW_B
40 MME_A
42 MME_B
45 eNB
50 HSS
55 AAA
60 PCRF
65 ePDG
70 WLAN ANa
75 WLAN ANb
80 LTE AN
90 Core network (type 1)
92 Core network (type 2)
100 PDN_A
102 PDN_B

The invention claimed is:

1. A User Equipment (UE) comprising:
transmission/reception circuitry configured to transmit, to a base station device in an access network, identification information of a dedicated core network in an attach procedure; and
a controller configured to establish a communication path with the dedicated core network in the attach procedure, wherein
the transmission/reception circuitry is further configured to communicate by using the established communication path, and
the identification information transmitted in the attach procedure is used by the base station device to select a first core network device in the dedicated core network.

2. The UE according to claim 1, wherein
the identification information is transmitted by the base station device to the first core network device in the attach procedure.

3. The UE according to claim 1, wherein
the identification information is information received from a second core network device.

4. The UE according to claim 1, wherein
the transmission/reception circuitry is further configured to transmit, to the base station device, the identification information in a tracking area update procedure, and
the identification information transmitted in the tracking area update procedure is used by the base station device to select the first core network device in the dedicated core network.

5. The UE according to claim 1, wherein the dedicated core network is a core network dedicated to a specific type UE.

6. The UE according to claim 1, wherein the dedicated core network is one of a plurality of different core networks.

7. A base station device in an access network, the base station device comprising:
- reception circuitry configured to receive, from a User Equipment (UE), identification information of a dedicated core network in an attach procedure;
- a controller configured to select a core network device in the dedicated core network based on the identification information; and
- transmission circuitry configured to transmit an attach request message to the selected core network device.

8. The base station device according to claim 7, wherein the transmission circuitry is further configured to transmit, to the core network device, the identification information in the attach procedure.

9. The base station device according to claim 7, wherein in a case that the reception circuitry further receives the identification information in a tracking area update procedure,
- the controller is configured to select the core network device in the dedicated core network based on the identification information, and
- the transmission circuitry is configured to transmit a tracking area update request message to the selected core network device.

10. The base station device according to claim 9, wherein the transmission circuitry is further configured to transmit, to the core network device, the identification information in the tracking area update procedure.

11. The base station device according to claim 7, wherein the dedicated core network is a core network dedicated to a specific type UE.

12. A communication control method performed by a User Equipment (UE), the communication control method comprising:
- transmitting, to a base station device in an access network, identification information of a dedicated core network in an attach procedure;
- establishing a communication path with the dedicated core network in the attach procedure; and
- being capable of communicating by using the established communication path, wherein
- the identification information transmitted in the attach procedure is used by the base station device to select a first core network device in the dedicated core network.

13. The communication control method according to claim 12, wherein
- the identification information is transmitted by the base station device to the first core network device in the attach procedure.

14. The communication control method according to claim 12, wherein the identification information is information received from a second core network device.

15. The communication control method according to claim 12, the communication control method further comprising:
- transmitting, to the base station device, the identification information in a tracking area update procedure, wherein
- the identification information transmitted in the tracking area update procedure is used by the base station device to select the first core network device in the dedicated core network.

16. The communication control method according to claim 12, wherein the dedicated core network is a core network dedicated to a specific type UE.

17. A communication control method performed by a base station device in an access network, the communication control method comprising:
- receiving, from a User Equipment (UE), identification information of a dedicated core network in an attach procedure;
- selecting a core network device in the dedicated core network based on the identification information; and
- transmitting an attach request message to the selected core network device.

18. The communication control method according to claim 17, wherein
- the base station device transmits, to the core network device, the identification information in the attach procedure.

19. The communication control method according to claim 17, the communication control method further comprising:
- in a case that the base station device further receives the identification information in a tracking area update procedure,
  - selecting the core network device in the dedicated core network based on the identification information; and
  - transmitting a tracking area update request message to the selected core network device.

20. The communication control method according to claim 19, wherein
- the base station device transmits, to the core network device, the identification information in the tracking area update procedure.

21. The communication control method according to claim 17, wherein the dedicated core network is a core network dedicated to a specific type UE.

* * * * *